United States Patent
Nakagawa

(10) Patent No.: US 7,010,219 B2
(45) Date of Patent: Mar. 7, 2006

(54) CODED PICTURE DATA REPRODUCING APPARATUS

(75) Inventor: Masaki Nakagawa, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 1109 days.

(21) Appl. No.: 09/810,447

(22) Filed: Mar. 19, 2001

(65) Prior Publication Data

US 2001/0022892 A1 Sep. 20, 2001

(30) Foreign Application Priority Data

Mar. 17, 2000 (JP) .................... 2000-075174

(51) Int. Cl.
H04N 5/917 (2006.01)

(52) U.S. Cl. .............. 386/111; 375/240.12; 386/68
(58) Field of Classification Search ........... 386/6–8, 386/33, 68–70, 81, 82, 111, 112; 375/240.12–240.16
See application file for complete search history.

(56) References Cited

U.S. PATENT DOCUMENTS

| | | | |
|---|---|---|---|
| 5,959,690 A | * | 9/1999 | Toebes et al. .............. 348/578 |
| 6,021,250 A | * | 2/2000 | Hyodo et al. .............. 386/95 |
| 6,275,618 B1 | * | 8/2001 | Kodama .............. 386/68 |
| 6,584,153 B1 | * | 6/2003 | Gordon et al. .......... 375/240.13 |
| 6,658,199 B1 | * | 12/2003 | Hallberg .............. 386/68 |

FOREIGN PATENT DOCUMENTS

JP 0807910 A 3/1996

* cited by examiner

Primary Examiner—James J. Groody
Assistant Examiner—Christopher Onuaku
(74) Attorney, Agent, or Firm—Pillsbury Winthrop Shaw Pittman LLP

(57) ABSTRACT

A coded picture data reproducing apparatus which is able to repetitively reproduce picture data starting at a designated start-frame is provided. The coded picture data reproducing apparatus is capable of reproducing predictively coded MPEG system picture data by using a correlation between frames and thus capable of repetitively reproducing frames across a designated start-position and an end-position. When a frame corresponding to a B-picture to be reproduced in preceding a frame corresponding to an I-picture, among picture data in GOPs in reproduction is designated as a start-frame, a controller Mp controls to execute the repetitive reproduction across the start-frame and an end-frame by controlling an optical pickup Pu, a memory Dmp for storing picture data and an MPEG decoder Mpg to fetch the B-picture of the frame corresponding to the decoded start-frame.

11 Claims, 21 Drawing Sheets

| VOBU_SRI | |
|---|---|
| FWDA240 | + 240 VOBU'S START-ADDRESS |
| FWDA120 | + 120 VOBU'S START-ADDRESS |
| FWDA60 | + 60 VOBU'S START-ADDRESS |
| FWDA20 | + 20 VOBU'S START-ADDRESS |
| FWDA15 | + 15 VOBU'S START-ADDRESS |
| FWDA14 | + 14 VOBU'S START-ADDRESS |
| FWDA13 | + 13 VOBU'S START-ADDRESS |
| FWDA12 | + 12 VOBU'S START-ADDRESS |
| FWDA11 | + 11 VOBU'S START-ADDRESS |
| FWDA10 | + 10 VOBU'S START-ADDRESS |
| FWDA9 | + 9 VOBU'S START-ADDRESS |
| FWDA8 | + 8 VOBU'S START-ADDRESS |
| FWDA7 | + 7 VOBU'S START-ADDRESS |
| FWDA6 | + 6 VOBU'S START-ADDRESS |
| FWDA5 | + 5 VOBU'S START-ADDRESS |
| FWDA4 | + 4 VOBU'S START-ADDRESS |
| FWDA3 | + 3 VOBU'S START-ADDRESS |
| FWDA2 | + 2 VOBU'S START-ADDRESS |
| FWDA1 | + 1 VOBU'S START-ADDRESS |
| BWDA1 | - 1 VOBU'S START-ADDRESS |
| BWDA2 | - 2 VOBU'S START-ADDRESS |
| BWDA3 | - 3 VOBU'S START-ADDRESS |
| BWDA4 | - 4 VOBU'S START-ADDRESS |
| BWDA5 | - 5 VOBU'S START-ADDRESS |
| BWDA6 | - 6 VOBU'S START-ADDRESS |
| BWDA7 | - 7 VOBU'S START-ADDRESS |
| BWDA8 | - 8 VOBU'S START-ADDRESS |
| BWDA9 | - 9 VOBU'S START-ADDRESS |
| BWDA10 | - 10 VOBU'S START-ADDRESS |
| BWDA11 | - 11 VOBU'S START-ADDRESS |
| BWDA12 | - 12 VOBU'S START-ADDRESS |
| BWDA13 | - 13 VOBU'S START-ADDRESS |
| BWDA14 | - 14 VOBU'S START-ADDRESS |
| BWDA15 | - 15 VOBU'S START-ADDRESS |
| BWDA16 | - 16 VOBU'S START-ADDRESS |
| BWDA20 | - 20 VOBU'S START-ADDRESS |
| BWDA60 | - 60 VOBU'S START-ADDRESS |
| BWDA120 | - 120 VOBU'S START-ADDRESS |
| BWDA240 | - 240 VOBU'S START-ADDRESS |

FIG. 3

CODED PICTURE DATA REPRODUCING APPARATUS

FIELD OF THE INVENTION

The present invention relates to an apparatus for reproducing a coded picture data which is coded by using a predictive coding scheme, and more particularly to a coded picture data reproducing apparatus which is able to repetitively reproduce pictures between across frames by designating two any frames.

BACKGROUND OF THE INVENTION

A conventional coded picture data reproducing apparatus will be explained in reference to FIGS. 16 to 21.

FIG. 16 is a block diagram showing a conventional coded picture data reproducing apparatus.

The coded picture data reproducing apparatus, as shown in FIG. 16, is comprised of a microprocessor Mp, a key input system Kb, a motor drive circuit Mdd, a disc drive motor Dm, a motor drive circuit Mdp, an optical pickup drive motor Pm, an optical pickup Pu, a syntax decoder Sx, an MPEG decoder Mpg, a frame buffer Fb, a video D/A (Digital to Analog) converter Vda and a front-end processor Fep.

The front-end processor Fep is comprised of a data detecting circuit Ds and an error correction code (hereinafter referred to ECC) processing circuit Ec.

A turntable (not shown) for loading thereon the optical disc D is coupled to a rotor shaft of the disc drive motor Dm. The turntable is driven by the rotation of the rotor shaft and thus rotates the optical disc D loaded thereon.

The video D/A converter Vda has an analog video signal output terminal which is capable of mechanically and electrically connecting to a signal line.

The signal line is able to be both mechanically and electrically connected to a video input terminal of the monitor Mnt having a display device such as a liquid crystal device or a cathode-ray tube. The video D/A converter Vda forwards video signals to the monitor Mnt via the signal line.

The monitor Mnt displays a picture image on its display screen according to the input video signal.

Further, the MPEG decoder Mpg has an output terminal which is capable of outputting a digital video signal.

The microprocessor Mp is connected to the key input system Kb, the motor drive circuit Mdd and the motor drive circuit Mdp via the signal line.

The microprocessor Mp is connected to the front-end processor Fep, the syntax decoder Sx and the MPEG decoder Mpg via the two-way bus line.

Further, the microprocessor Mp controls circuit blocks connected thereto according to the command provided through a key-input system Kb.

For instance, when the user command for directing a reproduction of the picture data recorded on the optical disc D is forwarded from the key input system Kb to the microprocessor Mp, the microprocessor Mp forwards operation signals to the motor drive circuit Mdd and the motor drive circuit Mdp for making them rotate the optical disc D.

The motor drive circuits Mdd and Mdp receive the operation signals from the microprocessor Mp and then forward driving signals to a disc drive motor Dm and an optical pickup drive motor Pm respectively coupled thereto.

The disc drive motor Dm rotates the optical disc D at the rotation speed according to the driving signal.

The optical pickup drive motor Pm moves the optical pickup Pu to the optical disc D in the radius direction according to the driving signal so that the optical pickup Pu search the picture data to be reproduced.

The optical pickup Pu irradiates a laser beam to the signal recording surface of the optical disc D so as to obtain record signal based on the reflection light.

The disc is recorded thereon picture data and addresses for indicating the record positions of the picture data. And the optical pickup Pu is moved according to the address to search the picture data to be reproduced.

The optical pickup Pu searches the picture data to be reproduced, and then obtains the record signal corresponding to the picture data on the disc.

The record signal picked up by the optical pickup Pu is forwarded to the data extracting circuit Ds which is contained in the front-end processor Fep, which is located in rear of the optical pickup Pu.

The record signal is a wave-formed signal called a RF signal. The data extracting circuit Ds slices the RF signal at a specific timing so as to generate a rectangular waveformed data signal.

Further, the data extracting circuit Ds forwards the data signal to the ECC processing circuit Ec on the rear.

The data signal is record by executed a NRZI (Non Return to Zero Inverted) modulation at recording time.

The ECC processing circuit Ec extracts a data signal from the invert interval of the data signal according to the NRZI demodulation rule, and performs the error correction of the data in each ECC block, then it forwards the data signal to the syntax decoder Sx located in rear of the circuit Ec.

The syntax decoder Sx extracts the control data from the input data signal according to the command that is output from the microprocessor Mp. Further the syntax decoder Sx extracts the picture data and forwards the picture data to the MPEG decoder Mpg located in rear of the decoder Sx.

The picture data is coded in the MPEG (Moving Picture Expert Group) system. The picture data is decoded in the MPEG decoder Mpg by the command output from the microprocessor Mp according to the decoding algorithm of pre-determined MPEG system.

A frame buffer Fb, which is connected to the MPEG decoder Mpg via the two-way bus line works as a work memory for temporarily storing the picture data when the MPEG coded picture data is decoded.

The picture data temporarily stored in the frame buffer Fb is added a synchronizing data for every frame, then it is output to the video D/A converter Vda located in rear of the MPEG decoder Mpg.

Or the MPEG decoder Mpg could output the picture data from the digital video signal output terminal as the digital video signal.

The video D/A converter Vda converts the input picture data into the analog video signal.

Then, the video D/A converter Vda forwards the video signal which is converted to the analog signal to the monitor Mnt located in rear of the converter Vda, via the signal line.

The monitor Mnt displays the picture image on a display device such as a liquid crystal device or a cathode-ray tube according to the input video signal.

In the coded picture data reproducing apparatus according to the present invention, the picture image is reproduced in the way as mentioned above.

Here, the decoding algorithm of the MPEG decoder Mpg will be explained in reference to FIG. 17.

FIG. 17 illustrates a data structure of the picture data of the MPEG system.

The MPEG system is one of the predictive coding schemes based on the correlation between picture frames. The coded picture data is comprised of a plurality of groups of pictures (hereinafter referred to GOP).

One GOP is comprised of a plurality of frames. Each frame is a coded picture data comprised of a picture data of an intraframe coded picture (I-picture), a plurality of interframe forward predictive coded pictures (P-pictures) and a plurality of bi-directional predictive coded pictures (B-pictures).

In FIG. 17, the frames of the I-picture, P-picture and B-picture in the (N–1)-th through (N+R)-th GOPs are arranged in the sequence of reproducing for convenience of explanation.

Specifically, the sequence of reproducing the frames of the pictures will be in the sequence of B→B→I→B→B→P→B→B→P→B→B→P.

When the MPEG coded data are actually transmitted or recorded, the data are transmitted or recorded in the sequence different from the above-mentioned sequence.

Specifically, the sequence for transmitting or recording the pictures will be in the sequence of I→B→B→P→B→B→P→B→B→P→B→B.

The above-mentioned pictures are coded in a predetermined sequence according to the correlation between picture frames Each of the above-mentioned pictures is an example illustrating a part of the GOP. While the number of pictures is not limited to the above examples.

For instance, although two B-pictures precede the I-picture in their reproducing sequence, the number of B-pictures preceding the I-picture may be three.

As described above, the MPEG system is a coding system of the picture signal according to the predictive coding scheme.

Especially, since the MPEG system is subjected to moving pictures, the data of each frame can be coded based on the correlation between the I-picture data which will be a frame standard of the moving picture and the P-picture data, B-picture data which are coded the difference of the I-picture data.

Specifically, an amount of change between frames of the moving picture before coding the frames is transformed to a motion-adaptive vector. Then the pictures of the frames are coded so as that they are predictively interpolated based on the motion-adaptive vector.

As a sequence of coding the data, initially the picture signal of the fame to be made as an I-picture is coded. Secondarily the picture signal of the frame to be made as a P-picture based on its correlation to the coded I-picture is coded. And thirdly, the picture signal of the frame to be reproduced between the I-picture and the P-picture is coded as a B-picture based on its correlations to both the I-picture and the B-picture.

Further, as the sequence of coding the pictures are predetermined, the sequence of decoding the pictures are also predetermined.

That is, initially, the picture data of the I-picture is decoded. Secondarily, the picture data of the P-picture is decoded by using the picture data of the decoded I-picture. And thirdly, the picture data of the B-pictures are decoded by using the picture data of the decoded I-picture and the P-picture.

A reason for that the sequences of the coding and the decoding are predetermined is that the P-picture and B-pictures are coded in reference to the I-picture.

Especially, since the B-pictures are coded with reference to the I-picture and P-pictures, the B-picture have to be decoded by using the already decoded I-picture and B-pictures.

As shown in FIG. 17, when the B-picture data B1, B2 belonging to the N-th GOP are decoded, first the P-picture data Pp which is reproduced last in the (N–1)-th GOP reproduced just before the B-picture data is decoded, then the I-picture data Ip belonging to the N-th GOP is decoded, after that the B-picture data B1, B2 are decoded by using the decoded P-pictures and the I-pictures.

The MPEG decoder Mpg, as shown in FIG. 16, temporarily stores the picture data for two GOPs in the frame buffer Fb and decodes the I-picture data Ip, the P-picture data Pp and the B-picture data B1, B2 in the sequence as mentioned above. Accordingly, in a normal reproduction the P-picture data Pp belonging to the (N–1)-th GOP, the B-picture data B1, B2 and I-picture data Ip belonging to the N-th GOP are continuously decoded, then the picture data is temporarily stored in the frame buffer.

That is, the picture data corresponding to all of the frames in the N-th GOP and the (N–1)-th GOP reproduced just before the N-th GOP are temporarily stored in the frame buffer Fb.

As shown in FIG. 17, even in the case that the P-picture data reproduced last in the (N–1)-th GOP that is reproduced just before the N-th GOP is used for decoding the B-picture data B1, B2 corresponding the frame reproduced in preceding the I-picture data Ip in the N-th GOP, the P picture data Pp which is temporarily stored in the frame memory Fb could be quoted, so that all of the frames are able to be decoded consecutively.

Now a repetitive reproduction in the conventional coded picture data reproducing apparatus will be explained hereinafter.

Here, the start-frame and the end-frame for the repetitive reproduction are each marked as the position A and the position B in FIG. 17.

After the A and the position Bs are designated as a start-frame and a end-frame, respectively, the picture between these two positions is repetitively reproduced, first the optical pickup Pu decodes the P-picture data on the position B which belongs to the (N+R)-th GOP and searches the picture data on the position A which belongs the N-th GOP, thus it obtains the picture data of all of the fames belonging to the GOP as mentioned above.

Then, the MPEG decoder Mpg decodes the fetched picture data.

However, if the N-th GOP is not the closed type GOP, as mentioned above the decoded P-picture data Pp corresponding to the P-picture frame which will be reproduced last in the (N–1)-th GOP is essential for decoding the B-picture data B1, B2 which correspond to the P-picture frame in the (N–1)-th GOP and the I-picture frame in the N-th GOP. That is, the B-picture data B1, B2 are not decoded by only the picture of the frame belonging to the N-th GOP.

Here, the operation of the coded picture data reproducing apparatus, as shown in FIG. 16, will be explained in reference to the flowcharts, as shown in FIGS. 18 through 21.

FIG. 18 illustrates a main routine in the operation of the conventional coded picture data reproducing apparatus.

FIG. 19 illustrates a first sub-routine in the operation of the conventional coded picture data reproducing apparatus.

FIG. 20 illustrates a second sub-routine in the operation of the conventional coded picture data reproducing apparatus.

These main routines and the first and the second sub-routines mentioned above are connected by the nodes 1 to 3.

The programs shown by the flowcharts have been installed in the microprocessor Mp, as shown in a block diagram of FIG. 16. That is, the microprocessor Mp controls the optical pickup Pu or the MPEG decoder Mpg in the coded picture data reproducing apparatus by the command according to the determination and/or processing steps, as shown in the flowchart, so as to execute the repetitive reproduction of pictures between the start-frame and the end-frame that are designated by the key input system Kb.

In FIG. 18, S61 denotes the "START" step of this program.

Following the "START" step S61, the process goes to step S62.

In step S62, an initial value is substituted for the arguments N and R to search the MPEG encoded picture data in every GOP which are recorded on the optical disc D.

The values N and R are stored in the internal memory of the microprocessor Mp.

In step S62, the value N is set to the positive integer larger than 0, and the value R is set to −1.

Next, the process goes to step S63.

In step S63, the optical pickup Pu is driven by the optical pickup drive motor Pm in order to search and obtain the picture data belonging to the (N+R)-th GOP.

Then, the picture data is decoded per each frame of the GOP in the MPEG decoder Mpg. After that all of the decoded picture data are temporarily stored in the frame buffer Fb.

To start the reproduction of the picture data, the picture data of the frames of the pictures are forwarded to the video D/A converter Vda on the rear in the reproducing sequence.

The video D/A converter Vda starts the conversion of the input picture data into the analog video signal, and then sequentially forwards the converted video signal to the monitor Mnt via the signal line.

The monitor Mnt starts the reproduction of the picture by the input video signal.

Since the value N is set to the positive integer larger than 0, and the value R is set to −1 in the previous step S62, the picture data fetched first will be the data belonging to the (N−1)-th GOP.

Next, the process goes to step S64.

In step S64, at the reproducing time of the picture data belonging to the (N+R)-th GOP it is discriminated whether or not the start-frame (position A) is designated.

The start-frame (position A) that is the start position for the repetitive reproduction is designated by pressing a start position designation key mounted through a key-input system Kb.

In case that the determination in step S64 results in "YES", i.e., when it is determined that there is a designation of the start-frame (position A), the process goes to the first sub-routine, as shown in FIG. 19, via the node 1.

However, in case that the determination in step S64 results in "NO", i.e., when it is determined that there is no designation of the start-frame (position A), the process goes to step S65.

In step S65, the argument R is incremented by 1 in order to search and obtain the picture data belonging to the next GOP.

Since the initial value R is set to the value −1 in step S62, the picture data fetched next will be belonged in the N-th GOP.

As described above, the value R is stored in the internal memory of the microprocessor Mp. The microprocessor Mp obtains the picture data belonging to the GOP based on the argument R by the optical pickup Pu.

Next, the process goes to step S66.

In step S66, it is discriminated whether or not the reproducing operation of the coded picture data reproducing apparatus is completed.

The judgment if the reproducing operation is completed or not is determined whether or not an end key mounted through a key-input system Kb has been pressed.

If it is determined that a designation for an end-frame (position B) has been made, and then determined that the reproduction has completed, i.e., the determination has resulted in "YES" in step S66, the process goes to the "END" step S67 and become complete.

However, in case that the determination results in "NO", i.e., when it is not determined that the STOP-key has been pressed, and that the reproducing is not complete, the process of step S63 is again executed.

Here, the processing's from step S63 to step S66 are repetitively executed till it is discriminated that the reproducing processing is completed in step S66, thus the picture data belonging to GOP is sequentially fetched and the fetched picture data is sequentially reproduced per each frame.

Steps from S63 to S66 form a conditional loop for reproducing the picture data belonging to GOP per each frame successively.

In this consecutive reproduction, the optical pickup Pu which is controlled by the microprocessor Mp obtains the data as tracing the data truck formed on the truck of disc D.

The picture data belonging to each GOP is sequentially recorded on the data truck. Thus, if the optical pickup Pu traces the data truck, the coded picture data reproducing apparatus obtains the picture data belonging to each GOP sequentially inevitably so as to carry out the successive reproducing.

Next, the first sub-routine of this program will be explained in reference to FIG. 19.

The first sub-routine performs the main routine, as shown in FIG. 18, and the program of the node 1 and following programs.

The process of step S68 is carried out when the determination in step S64 results in "YES", i.e., when it is determined that there is a designation of the start-frame (position A).

In this time, the microprocessor Mp makes the number of the designated start-frame be stored in its internal memory.

The frame number is a relative information showing the position of the frame in the GOP.

The process goes to step S69.

In step S69, the microprocessor Mp makes the number of the GOP containing the picture data of the start-frame be stored in its internal memory.

In the program, the number of the GOP containing the start-frame is defined as X.

Then, by substituting the value N+R for the value X, the number of the GOP containing the start-frame is stored in an internal memory of the microprocessor Mp.

In this time, an address which is used for searching the picture data belonging to the GOP is also stored in the internal memory by linked to the GOP number, so that the address is quoted based on the GOP number.

The microprocessor Mp is able to search the picture data of the designated start-frame based on the GOP number and the start-frame number that are stored in the internal memory.

Next, it goes to the judgment processing in step S70.

In step S70, it is discriminated whether or not the (N+R)-th GOP wherein the picture data of the designated start-frame is contained is a closed type.

Whether the GOP is closed type or not is determined by the value of the GOP type flag that is the control data applied to each GOP is one or zero.

The GOP type flag is contained in the control data that is extracted by the syntax decoder Sx. The syntax decoder Sx extracts the control data for each GOP.

An entire picture data belonging to the closed type GOP is able to be decoded without the use of the picture data of the frame belonging to other GOP.

As mentioned above, the picture data belonging to the non-closed type GOP are not able to be decoded unless using already decoded P-picture data corresponding to last frame that is reproduced last in the GOP to be reproduced just before the GOP containing the B-picture corresponding to the frame which is reproduced in preceding the frame corresponding to the I-picture.

Here, if the result of determination of the GOP type is YES, that is, if the microprocessor Mp determines the GOP type a closed type GOP based on the GOP type flag, the process goes to step S71.

If the result if NO, that is, if the GOP is not a closed type, the process goes to step S72.

In step S71, the microprocessor Mp sets the GOP type flag to "1".

In step S72, the microprocessor Mp sets the GOP type flag to "0".

When completed the processes in both steps S71 and S72, the microprocessor Mp carries out the determination process in step S73.

In step S73, it is discriminated whether or not the end-frame (position B) is designated at reproducing time of picture data belonging to the (N+R)-th GOP.

The end-frame (position B) is designated by pressing an end position designation key mounted through a key-input system Kb.

In case that the determination in step S74 results in "YES", i.e., when it is determined that there is a designation of the end-frame (position B), the process goes to the second sub-routine, as shown in FIG. 6, via the node 2.

However, in case that the determination in step S73 results in "NO", i.e., when it is determined that there is no designation of the end-frame (position B), the process goes to step S74.

In step S74, an argument R is incremented by 1 in order to search and obtain the picture data belonging to the next GOP.

Next, the process goes to step S75.

In step S75, the microprocessor Mp drives the optical pickup Pu by the optical pickup drive motor Pm so as to search and obtain the picture data belonging to the (N+R)-th GOP.

Here, since the value R is incremented by "1", the fetched picture data belongs to another GOP that follows the GOP wherein the start-frame belongs.

Then, the picture data in the GOP is decoded in every frame by the MPEG decoder Mpg. All of the decoded frame data are temporarily stored in the frame buffer Fb.

To start the reproduction of the picture data, the frames of the pictures are forwarded to the video D/A converter Vda on the rear in the reproducing sequence.

Then, the video D/A converter Vda starts the conversion of the input picture into the analog video signal, and then it sequentially displays the converted video signal as a picture on the monitor Mnt via the signal line.

Accordingly, the monitor Mnt displays the pictures of the fetched GOPs based on the input video signals.

That is, a series of the processes across steps S70 to S75 is repetitively executed and thus the picture data belonging to GOP on the data truck are sequentially reproduced, unless the end-fame is designated through the key input system Kb and the microcomputer Mp determines in step S73 to that an end-frame has been designated.

Steps from S70 to S75 form a conditional loop for consecutively reproducing the GOPs.

As mentioned above, at the successive reproducing time of GOP, the optical pickup Pu which is controlled by the microprocessor Mp obtains the picture data as tracing the data truck formed on the truck of disc D.

Next, the second sub-routine of this program will be explained in reference to FIG. 20.

The second sub-routine is programmed to execute the process following the first sub-routine, as shown in FIG. 20, via the node 2. That is, the second sub-routine is a program for the repetitive reproduction to be executed when designated the end-frame (position B).

The process of step S76 is carried out when the determination in step S73 results in "YES", i.e., when it is determined that there is a designation of the end-frame (position B).

In this time, the microprocessor Mp makes the number of the designated start-frame be stored in its internal memory.

The frame number is a relative information showing the position of the frame in the GOP.

The microprocessor Mp carries out the process of step S77 after the process of step S76 has completed.

In step S77, the microprocessor Mp substitutes the value X, i.e., the number of the GOP to which the picture data of the start-frame stored in the internal memory in step S69 belongs for the argument N.

Further, the microprocessor Mp substitutes the value 0 for the argument R so as to decode the picture data sequentially from the picture data belonging to the GOP containing the start-frame.

Further, the microprocessor Mp quotes the address for searching the picture data belonging to the GOP wherein the picture data of the start-frame is contained based on the argument N+R, and it moves the optical pickup Pu to the record position of the picture data belonging to the GOP on the disc based on the address so that the microprocessor Mp searches and obtains the picture data belonging t the GOP wherein the picture data of the start-frame belongs.

After processing in step S77, it goes to the judging processing in step S78.

In step S78, it is discriminated whether or not the GOP wherein the picture data of the start-frame belongs, that is, the (N+R)-th GOP is a closed type.

Whether the (N+R)-th GOP is closed type or not is determined by the value 1 or 0 of the GOP type flag set in the internal memory of the microprocessor Mp in step S71 or S72.

It is discriminated that if the GOP type flag stored in the internal memory of the microprocessor Mp is "1" the GOP wherein the picture data of the start-frame belongs is a closed type, and if the GOP type flag is "0" the GOP is not a closed type.

Here, if the result of the determination of the GOP type is YES, that is, the microprocessor Mp determines the GOP as a closed type based on the GOP type flag, the process goes to step S79. However, if the result if NO, that is, the GOP is not a closed type, the process goes to step S80.

In step S79, the microprocessor Mp decodes the picture data of the (N+R)-th GOP, that is, the GOP containing the picture data of the start-frame by controlling the MPEG decoder Mpg. All of the decoded frame data are temporarily stored in the frame buffer Fb.

To start the reproduction of the picture data, the decoded picture data corresponding to the frames are forwarded to the video D/A converter Vda on the rear in the reproducing order from the B-picture data corresponding to the start-frame in the GOP.

In step S79, since the GOP wherein the picture data belongs is a closed type the B-picture data is able to be decoded by only the picture data belonging to the closed type GOP.

In step S80, the microprocessor Mp decodes the picture data of the (N+R)-th GOP, that is, the GOP containing the picture data of the S80 start-frame by controlling the MPEG decoder Mpg. All of the decoded frame data are temporarily stored in the frame buffer Fb.

Here, since the GOP containing the start-frame picture data is not a closed type, the B-picture data corresponding to the frame which is reproduced precede the frame of the I-picture is not able to be decoded.

Accordingly the frames corresponding to the B-pictures which are not decoded in this step S80 are not able to be forwarded to the video D/A converter.

Thus, in this step, the picture data of each frame corresponding to B-picture which is not decoded is excluded, and the picture data of the frame corresponding to the I-picture which is reproduced first in this GOP is forwarded to the video D/A converter Vda on the rear in the reproducing sequence.

In this time the picture of the frame corresponding to B-picture which was not decoded is not displayed on a screen of the monitor Mnt, while the reproduction starts at the picture of the frame corresponding to an I-picture. Then there occurs a problem which is so-called as "frame drop".

The microprocessor Mp carries out the processes of steps S79 and S80, then it goes to the process of step S81.

In step S81, the picture data of the end-frame is fetched by the optical pickup Pu, and it is discriminated whether or not the reproduction of the end-frame is completed.

In case that the determination in step S81 results in "YES", i.e., when it is determined that the reproduction of the picture of the end-frame is complete, the process of step S77 is again executed.

In this time, the microprocessor Mp again makes the optical pickup Pu move to search the picture data belonging to the N-th GOP containing the start-frame.

The picture data searched by the optical pickup are decoded in the MPEG decoder as mentioned above, and forwarded to the video D/A converter.

Steps from S77 to S81 form a conditional loop, wherein the picture data belonging to GOP is fetched by the optical pickup Pu sequentially, and it is decoded in the MPEG decoder Mpg, then it is reproduced in the monitor Mnt so as to reproduce the picture between the start-frame and the end-frame repetitively.

However, in case that the determination in step S81 results in "NO", i.e., when it is not determined that the STOP-key has been pressed, and that the reproducing is not complete, the process goes to step S82.

In this time, the microprocessor Mp obtains the picture data up to the last frame in the (N+R)-th GOP which have been reproduced, and it decodes these data in the MPEG decoder Mpg.

Then, the microprocessor Mp temporarily stores these data in the frame buffer Fb, and after that the microprocessor Mp successively forwards the picture data of each frame to the video D/A converter Vda in the reproducing sequence until completing the reproduction of all of the frames in a GOP.

In step S83, the microprocessor Mp counts up the argument R for fetching the GOP, and stores the value R in the internal memory.

Next, the process goes to step S84.

In step S84, it is discriminated whether or not the repetitive reproduction is complete.

Specifically, the operation for determining whether or not the repetitive reproduction STOP-key which is provided on the key-input system Kb has been pressed is executed by the microprocessor Mp.

Here, when it is determined that the repetitive reproduction is not complete, the process goes to step S79.

In this time, in step S83, since the value R has been incremented by "1", the reproduced picture data belongs to the following GOP.

That is, a series of steps S79 to S84 form a conditional loop for reproducing the picture data of each frame which belonging to the GOP under reproduction up to the end-frame.

The repetitive reproduction will be continued unless the microprocessor Mp determines the repetitive reproduction end-key mounted through a key-input system Kb has been pressed.

In step S84, when the microprocessor Mp determines that the repetitive reproduction is complete, the process returns to the main routine of FIG. 18 for the normal reproduction proceed from step S63 to step S66, via the node 3.

Here, the operation of the conventional coded picture data reproducing apparatus in case that the B-picture frame which is reproduced in preceding the I-picture in the GOP is designated as a start-frame (position A), then the end-frame (position B) is designated will be explained in reference to FIG. 21.

FIG. 21 illustrates the operation of the conventional coded picture data reproducing apparatus.

In FIG. 21, position A is a start-frame designated by the key input system Kb.

As shown in FIG. 21, position A as a start-frame, which picture data is corresponds to B-picture, is reproduced in preceding the frame corresponding to the I-picture.

Further in FIG. 21, position B is an end-frame designated by the key input system Kb.

The optical pickup Pu traces the truck to obtain the recorded picture data.

The MPEG decoder Mpg decodes the picture data and forwards the decoded picture data sequentially to the video D/A converter Vda. The video D/A converter Vda outputs the analog video signal corresponding to each frame, and the video signal is sequentially displayed on the monitor Mnt as a picture.

When the picture corresponding to the start-frame (position A) is displayed on the monitor Mnt, the key input system Kb specifies the start-frame.

Then, when the picture corresponding to the end-frame (position B) is displayed on the monitor Mnt, the key input system Kb specifies the end-frame. Thus the optical pickup Pu searches the GOP containing the start-frame.

In this time, the optical pickup Pu obtains the picture data belonging to the GOP which contains the picture data of the start-frame.

However, when the fetched GOP is not a closed type, the B-picture data that corresponds to the start-frame (position A) is not able to be decoded.

Accordingly, as illustrated by the broken-arrow line in FIG. 21, the frame at which the repetitive reproduction starts in following the reproduction of the end-frame will be a frame corresponding to the I-picture which preceeds two frames from the start-frame (position A). After that the repetitive reproduction is executed over the frame corresponding to the I-picture not but the start-frame (position A) and the end-frame (position B).

Here, the picture is displayed on the monitor Mnt in state of lacking two frames containing start-frame (position A), so the picture seems unnatural as a repetitive reproduction picture.

Further, there occurs the above-mentioned "frame drop", and thus it is impossible to achieve a perfect repetitive reproduction .

As described above, in the standard coded picture data which is coded by using the predictive coding scheme of MPEG system, in GOP a bi-directional predictive coded picture (B-picture data) which is reproduced in preceding an intraframe coded picture (I-picture data) has to be decoded after fetching the picture data in GOP which is reproduced just before the B-picture data and decoding an interframe forward predictive coded picture data (P-picture data) corresponding to the frame reproduced last in the preceding GOP.

That is, in the conventional coded picture data reproducing apparatus, when the frame corresponding to a bi-directional predictive coded picture data is designated as a start-frame at repetitive reproduction, the repetitive reproduction is not carried out from the picture corresponding to the designated start-frame. Thus, it is not realized to perform the repetitive reproduction between the exact designated frames.

As mentioned above, the conventional coded picture data reproducing apparatus has a drawbacks that when a frame corresponding to the bi-directional predictive coded picture data is designated as a start-frame it is not able to reproduce the picture data corresponding to the designated start-frame at repetitive reproduction time.

SUMMARY OF THE INVENTION

It is an object of the present invention to provide a coded picture data reproducing apparatus which is able to reproduce the picture data from a designated start-frame in a repetitive reproduction time.

To solve the problems as mentioned above, the present invention has an object to provide a coded picture data reproducing apparatus as follows.

A coded picture data reproducing apparatus for reproducing a coded picture data, which is a coded picture signal comprised of several frames corresponding to pictures reproduced in the specific reproducing sequence based on the predictive coding system, and which is comprised of several GOPs which consists of an intraframe coded picture data, an interframe forward predictive coded picture data and bi-directional predictive coded picture data, includes a data fetcher for fetching the coded picture data, a decoder for decoding the picture data corresponding to each frame of the coded picture data, a memory for storing an interframe forward predictive coded picture data corresponding to the frame which will be reproduced last within the GOP among the decoded picture data decoded by the decoder, a start-frame designator for designating a start-frame among the frames in the GOP, an end-frame designator for designating an end-frame among the frames in the GOP, a memory controller for controlling the memory to store the interframe forward predictive coded picture data corresponding to the frame which will be reproduced last in another GOP which will be reproduced just before the GOP wherein the picture data corresponding to the start-frame belongs, when the start-frame is designated by the start-frame designator, a data fetcher controller for controlling the data fetcher to fetch the picture data of GOP wherein the picture data corresponding to the start-frame belongs, when the end-frame is designated by the end-frame designator, a memory controller for controlling the memory to yield the interframe forward predictive coded picture data, and a decoder controller for controlling the decoder to decode the bi-directional predictive coded picture data corresponding to the frame reproduced between the frame corresponding to the interframe forward predictive coded picture which is output from the memory and the frame corresponding to the intraframe coded picture of the picture data group wherein the start-frame belongs, by using the interframe forward predictive coded picture data and the intraframe coded picture data, and also decode the picture data corresponding to the frames up to the end-frame.

Further, the coded picture data reproducing apparatus is characterized by that it repetitively reproduces the pictures corresponding to the respective frames from the start-frame to the end-frame.

Further, to solve the problems mentioned above, the coded picture data reproducing apparatus according to the present invention for reproducing a coded picture data, which is a coded picture signal comprised of several frames corresponding to pictures reproduced in the specific reproducing sequence based on the predictive coding system, and which is comprised of several GOPs which consists of an intraframe coded picture data, an interframe forward predictive coded picture data and bi-directional predictive coded picture data, includes a data fetcher for fetching the coded picture data, a decoder for decoding the picture data corresponding to each frame of the coded picture data, a memory for storing the bi-directional predictive coded picture data corresponding to the frame reproduced in preceding the frame corresponding to the intraframe coded picture data in the GOP among the picture data decoded by the decoder, a start-frame designator for designating a start-frame among the frames in the GOP, an end-frame designator for designating an end-frame among the frames in the GOP, a memory controller for controlling the memory to store the bi-directional predictive coded picture data corresponding to the frame reproduced in preceding the frame corresponding to the intraframe coded picture data in the GOP wherein the picture data corresponding to the start-frame belongs, when the start-frame is designated by the start-frame designator, a data fetcher controller for controlling the data fetcher to fetch the picture data of GOP wherein the picture data corresponding to the start-frame belongs, when the end-frame is designated by the end-frame designator, a memory controller for controlling the memory to yield the bi-directional predictive coded picture data, and a decoder controller for controlling the decoder to decode the picture data which follows the bi-directional predictive coded picture data output from the memory up to the end-frame.

Further, the coded picture data reproducing apparatus is characterized by that it repetitively reproduces the pictures corresponding to the respective frames from the start-frame to the end-frame.

Further, to solve the problems mentioned above, the coded picture data reproducing apparatus according to the present invention for reproducing a coded picture data, which is a coded picture signal comprised of several frames corresponding to pictures reproduced in the specific reproducing sequence based on the predictive coding system, and which is comprised of several GOPs which consists of an intraframe coded picture data, an interframe forward predictive coded picture data and bi-directional predictive coded picture data, includes a data fetcher for fetching the coded picture data, a decoder for decoding the picture data corresponding to the respective frames of the coded picture data, a data group address memory for storing address data for searching the GOP, a start-frame designator for designating a start-frame among the frames in the GOP, an end-frame designator for designating an end-frame among the frames in the GOP, a memory controller for controlling the data group address memory to search the picture data in GOP which is reproduced just before the GOP wherein the picture data corresponding to the start-frame belongs, when the start-frame is designated by the start-frame designator, a data fetcher controller for controlling the data fetcher to fetch the picture data in GOP which is reproduced just before the GOP wherein the picture data corresponding to the start-frame belongs based on the address data stored in the data group address memory, when the end-frame is designated by the end-frame designator, a decoder controller for controlling the decoder to decode the picture data belonging to GOP reproduced just before the GOP wherein the picture data corresponding to the start-frame belongs, and to decode the bi-directional predictive coded picture data corresponding to the frame reproduced between the interframe forward predictive coded picture data and the intraframe coded picture data by using the interframe forward predictive coded picture data and the intraframe coded picture data, and further to decode the picture data corresponding to the frames to the end-frame.

Further, the coded picture data reproducing apparatus is characterized by that it repetitively reproduces the pictures corresponding to the respective frames from the start-frame to the end-frame

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a turntable showing a configuration of the VOBU search information VOBU_SRI;

DESCRIPTION OF THE PREFERRED EMBODIMENTS

The present invention will be described in detail with reference to the FIGS. 1 through 15.

The first embodiment of the present invention will be explained in reference to the accompanying drawings FIGS. 1 to 7.

Figure 1:
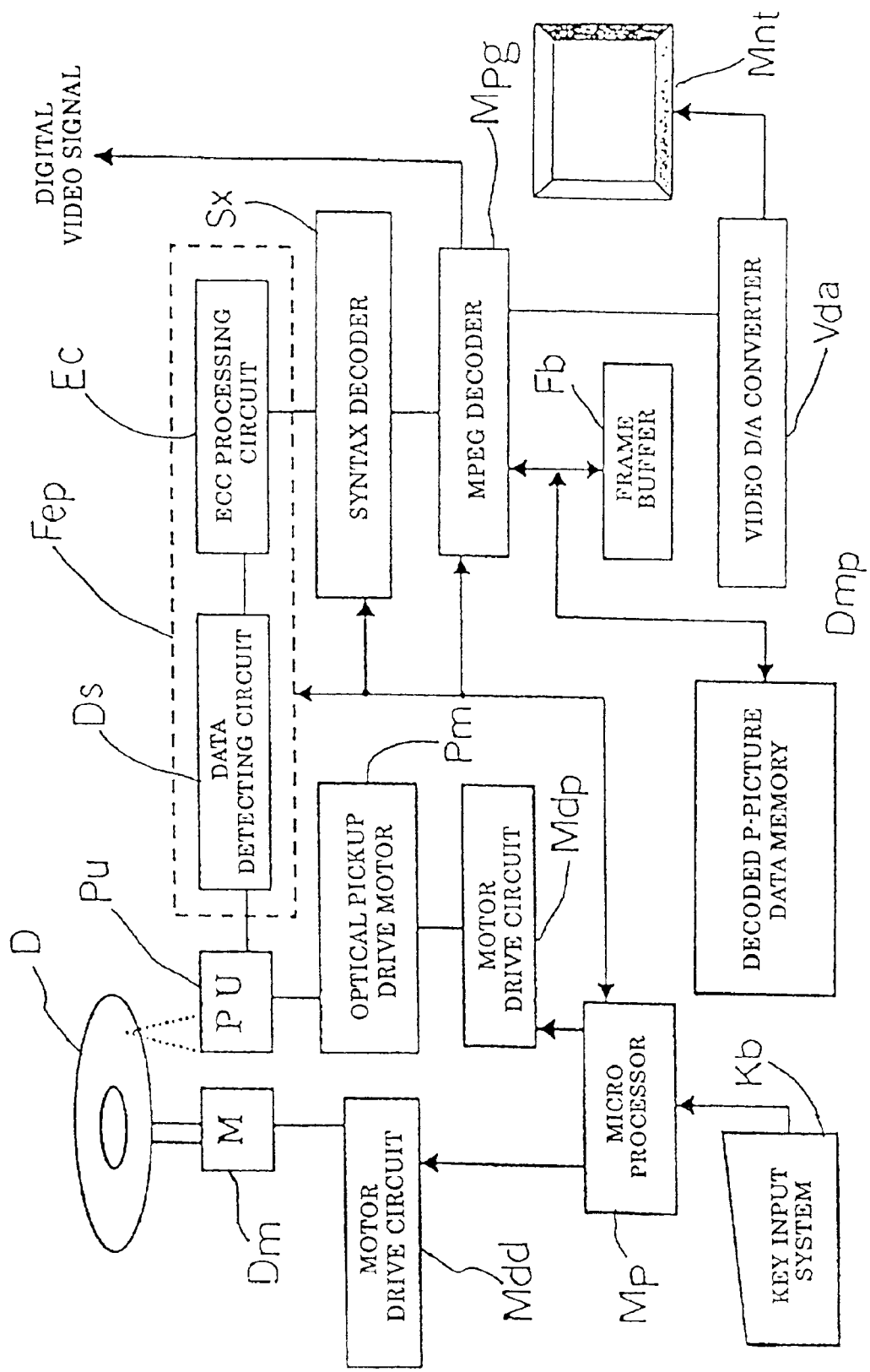
FIG. 1 is a block diagram showing a first embodiment of the coded picture data reproducing apparatus according to the present invention.

FIG. 1 is a block diagram of the first embodiment of the coded picture data reproducing apparatus.

The coded picture data reproducing apparatus, as shown in FIG. 1, is comprised of a microprocessor Mp, a key input system Kb, a motor drive circuit Mdd, a disc drive motor Dm, a motor drive circuit Mdp, an optical pickup drive motor Pm, an optical pickup Pu, a syntax decoder Sx, an MPEG decoder Mpg, a frame buffer Fb, a video D/A converter Vda and a front-end processor Fep.

The front-end processor Fep is comprised of a data detecting circuit Ds and an ECC processing circuit Ec.

A turntable (not shown) for loading thereon the optical disc D is fixed to the rotor shaft of the disc drive motor Dm. The turntable is driven by the rotation of the rotor shaft and thus rotates the optical disc D loaded thereon.

The video D/A converter Vda has a video signal output terminal which is capable of mechanically and electrically connecting to a signal line.

The signal line is able to be both mechanically and electrically connected to a video input terminal of the monitor Mnt with a display device such as a liquid crystal device or a cathode-ray tube. The video D/A converter Vda forwards the video signals to the monitor Mnt via the signal line.

The monitor Mnt displays a picture image on its display screen according to the input video signal.

Further, the MPEG decoder Mpg has an output terminal which is capable of outputting a digital video signal.

The microprocessor Mp is connected to the key input system Kb, the motor drive circuit Mdd and the motor drive circuit Mdp via the signal line.

The microprocessor Mp is connected to the front-end processor Fep, the syntax decoder Sx and the MPEG decoder Mpg via the two-way bus line.

Further, the microprocessor Mp controls blocks connected to the microprocessor Mp according to the command provided through a key-input system Kb.

For instance, when the user command for directing a reproduction of the picture data recorded on the optical disc D is forwarded from the key input system Kb to the microprocessor Mp, the microprocessor Mp forwards operation signals to the motor drive circuit Mdd and the motor drive circuit Mdp for making them rotate the optical disc D.

The motor drive circuits Mdd and Mdp receive the operation signals from the microprocessor Mp and then forward driving signals to a disc drive motor Dm and an optical pickup drive motor Pm respectively coupled thereto.

The disc drive motor Dm rotates the optical disc D at the rotation speed according to the driving signal.

The optical pickup drive motor Pm moves the optical pickup Pu to the optical disc D in the radius direction according to the driving signal so that the optical pickup Pu search the picture data to be reproduced.

The optical pickup Pu irradiates a laser beam to the signal recording surface of the optical disc D so as to fetch the record signal based on the reflection light.

The disc is recorded thereon picture data and addresses for indicating the record positions of the picture data. And the optical pickup Pu is moved according to the address to search the picture data to be reproduced.

The optical pickup Pu searches the picture data to be reproduced, then it fetches the record signal corresponding to the picture data on the disc.

The record signal picked up by the optical pickup Pu is forwarded to the data extracting circuit Ds which is contained in the front-end processor Fep, which is located in rear of the optical pickup Pu.

The record signal is a wave-formed signal called a RF signal. The data extracting circuit Ds slices the RF signal at a specific timing so as to generate a rectangular waveformed data signal.

Further, the data extracting circuit Ds forwards the data signal to the ECC processing circuit Ec on the rear.

The data signal is record by executed a NRZI (Non Return to Zero Inverted) modulation at recording time.

The ECC processing circuit Ec extracts a data signal from the invert interval of the data signal according to the NRZI demodulation rule, and performs the error correction of the data in each ECC block, then forwards the data signal to the syntax decoder Sx located in rear of the circuit Ec.

The syntax decoder Sx extracts the control data from the input data signal according to the command that is output from the microprocessor Mp. Further the syntax decoder Sx extracts the picture data and forwards the picture data to the MPEG decoder Mpg located in rear of the decoder Sx.

The picture data is coded in the MPEG (Moving Picture Expert Group) system. The picture data is decoded in the MPEG decoder Mpg by the command output from the microprocessor Mp according to the decoding algorithm of pre-determined MPEG system A frame buffer Fb, which is connected to the MPEG decoder Mpg via the two-way bus line works as a work memory for temporarily storing the picture data when the MPEG coded picture data is decoded.

The picture data temporarily stored in the frame buffer Fb is added a synchronizing data for every frame, then it is forwarded to the video D/A converter Vda located in rear of the MPEG decoder Mpg.

Or the MPEG decoder Mpg could output the picture data from the digital video signal output terminal as the digital video signal.

The video D/A converter Vda converts the input picture data into the analog video signal.

Then, the video D/A converter Vda forwards the video signal which is converted to the analog signal to the monitor Mnt located in rear of the converter Vda, via the signal line.

The monitor Mnt displays the picture image on a display device such as a liquid crystal device or a cathode-ray tube according to the input video signal.

In the coded picture data reproducing apparatus according to the present invention, the picture image is reproduced in the way as mentioned above.

In the coded picture data reproducing apparatus of the first embodiment, a decoded P-picture data memory Dmp is newly mounted for temporarily storing the decoded inter-frame forward predictive coded picture data (P-picture data) which is coded by the MPEG system.

The decoded P-picture data memory Dmp is comprised of a rewritable semiconductor memory.

The P-picture data memory Dmp is coupled to the two-way bus line for connecting the MPEG decoder Mpg and the frame buffer Fb.

A P-picture data corresponding to a frame which will be reproduced last in GOP among the P-picture data decoded in the MPEG decoder Mpg is stored in the decoded P-picture data memory Dmp.

The P-picture data stored in the decoded P-picture memory is updated in each GOP reproduced. And it is overwritten by the decoded P-picture that is corresponding to the frame reproduced last in the GOP reproduced in the same memory space.

Next, a record medium and data structure reproduced in the coded picture data reproducing apparatus according to the present invention will be explained hereinafter.

The record medium, that is, a disc D is based on a DVD video format. The picture data coded by the MPEG system is recorded on the optical disc D so as to comply with the DVD video format.

Here, the relation between the DVD video format and the MPEG format will be explained in reference to FIG. 2.

Figure 2:
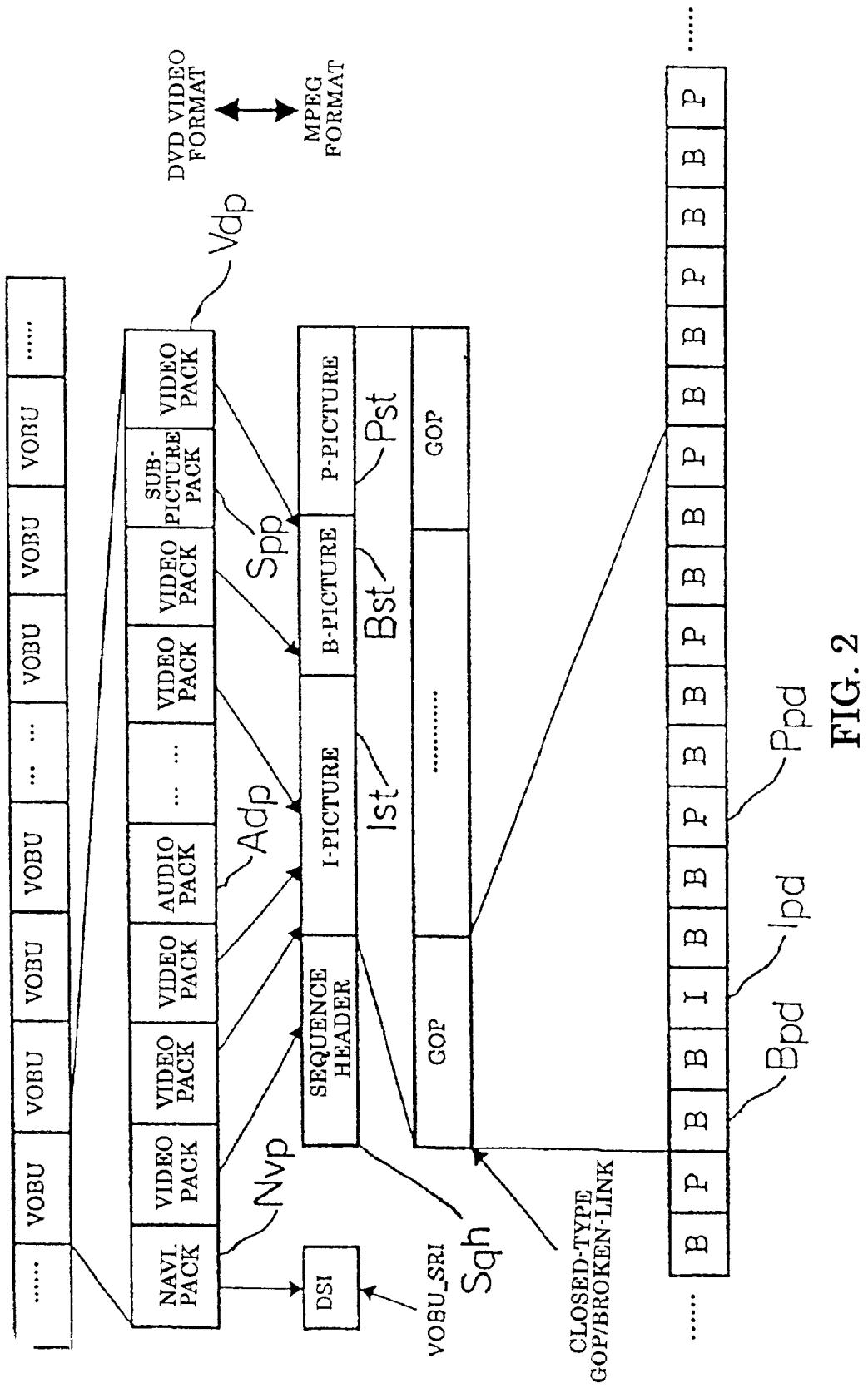
FIG. 2 illustrates data structure showing the relation between the picture data in the MPEG format and that in the DVD video format.

FIG. 2 illustrates a data structure showing the relation between the picture data in the MPEG format and the DVD video format.

In FIG. 2, a data block comprising a video object unit (hereinafter referred to VOBU) is one kind of a basic recording unit of the reproducing data (video, audio and sub-picture) which is denoted in the DVD video formats.

The VOBU is comprised of a navigation pack Nvp containing a control data, a video pack Vdp containing a picture data, an audio pack Adp containing an audio data and a sub-picture pack Spp containing a caption data that is superimposed on the picture data.

Those elements as mentioned above construct the data structure of the DVD video format.

The video pack contains coded data of header data and picture data according to the MPEG system. Picture data, which are contained in the GOP (Group Of Pictures, which is defined in the MPEG system as a collection of a plurality of picture data in a video pack Vdp), is comprised of an I-picture data stream Ist which is a group of intraframe coded picture data, a P-picture data stream Pst which is a group of an interframe forward predictive coded picture data, a B-picture data stream Bst which is a group of a bi-directional predictive coded picture data and a sequence header Sqh which is a control data for the GOP.

In each GOP, the I-picture data stream Ist is comprised of an I-picture data Ipd that is an intraframe coded picture data.

The I-picture data Ipd is a frameful of picture data.

The P-picture data P-st is comprised of a P-picture data Pp that is an interframe forward predictive coded picture data corresponding to a plurality of frames.

The B-picture data stream Bst is comprised of a B-picture data Bpd that is a bi-directional predictive coded picture data corresponding to a plurality of frames.

These coded picture data are configuration of the data in the MPEG format. These data in each GOP are stored in the video pack, and then these are encoded at a format in compliance with the DVD video format, and then recorded on a DVD disc.

Further, in the data structure with the MPEG format, a GOP type flag is contained in each GOP.

If the GOP type flag is "1", it indicates that all of the frames in the GOP are able to be decoded without the use of the picture data of a frame in other GOP. If the GOP type flag is "0", it indicates that a part of frames in the GOP is not able to be decoded without the use of a P-picture data that is reproduced last in the preceding GOP.

Further, in the data structure of the DVD video format, a disc search information (hereinafter referred to DSI) containing a VOBU search information VOBU_SRI for an access to other VOBU is contained in the navigation pack Nvp.

The configuration of the VOBU search information VOBU_SRI in the DSI will be explained in reference to FIG. 3.

FIG. 3 is a data table showing the configuration of the VOBU search information VOBU_SRI.

The VOBU search information VOBU_SRI is comprised of start address data showing the positions where other VOBUs are recorded which are reproduced before and after the standard VOBU containing the VOBU search information.

As mentioned above, a VOBU contains the picture data that belong to a couple of GOPs.

The picture data coded by the MPEG system is searched by a GOP unit. So, it will be easy to search the picture data by a GOP unit if the VOBU is searched by the VOBU search information VOBU_SRI.

Next, the operation of the coded picture data reproducing apparatus of the first embodiment, as shown in FIG. 1, will be explained in reference to FIGS. 4 to 6.

Figure 4:
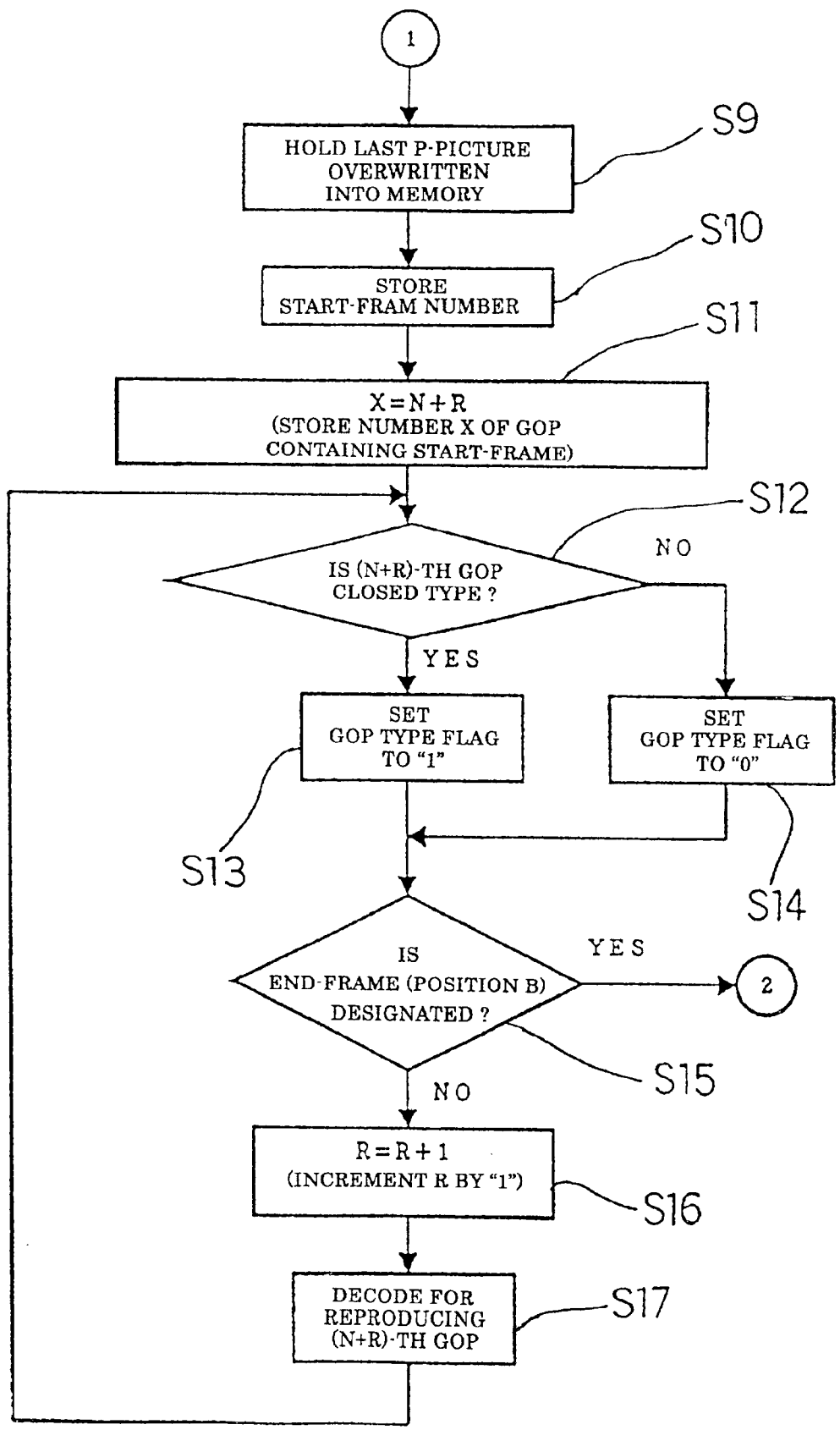
FIG. 4 illustrates a main routine in the operation of the coded picture data reproducing apparatus of a first embodiment.

FIG. 4 illustrates a main routine in the operation of the coded picture data reproducing apparatus of the first embodiment.

Figure 5:
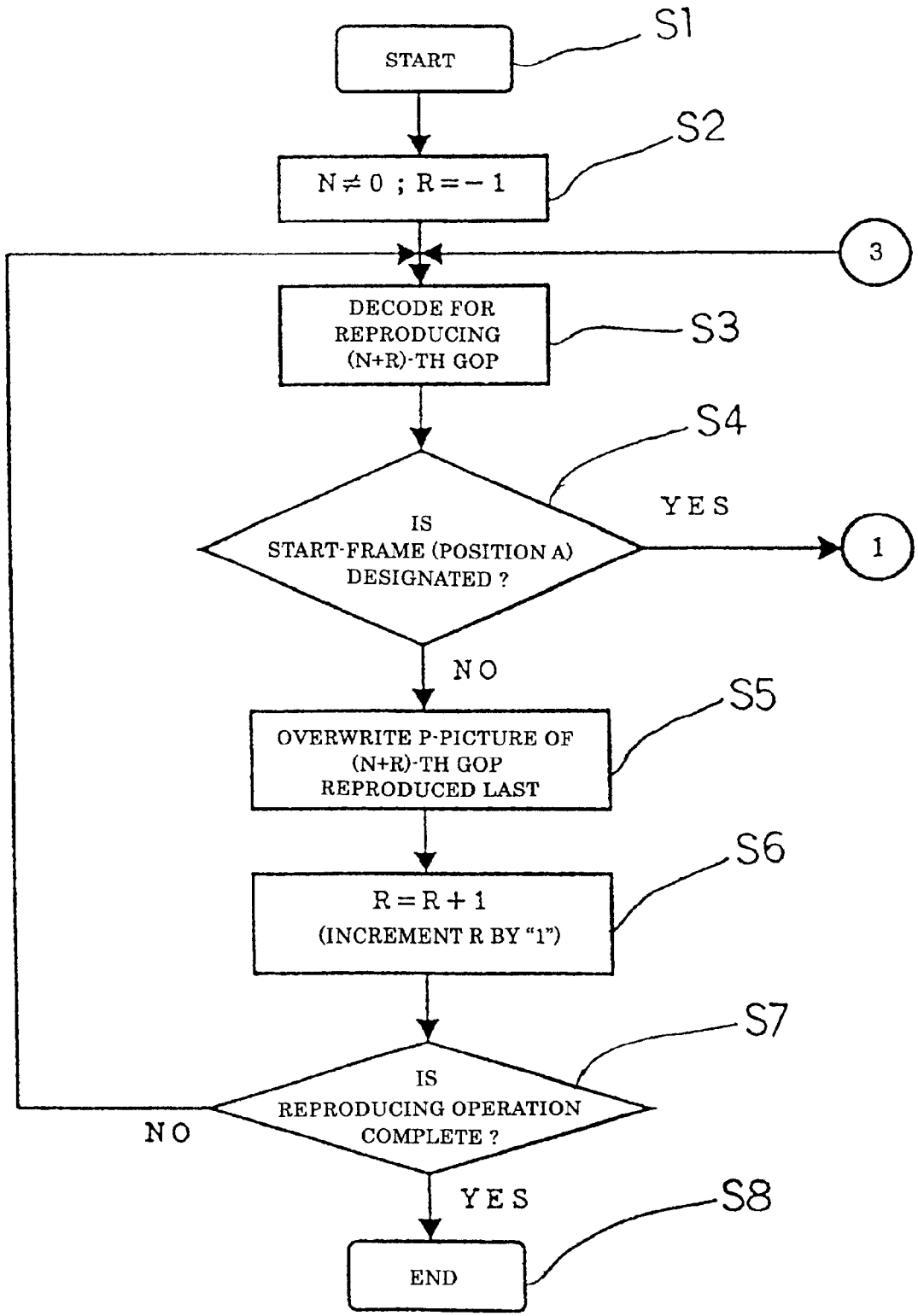
FIG. 5 illustrates a first sub-routine in the operation of the coded picture data reproducing apparatus of the first embodiment.

FIG. 5 illustrates a first sub-routine in the operation of the coded picture data reproducing apparatus of the first embodiment.

Figure 6:
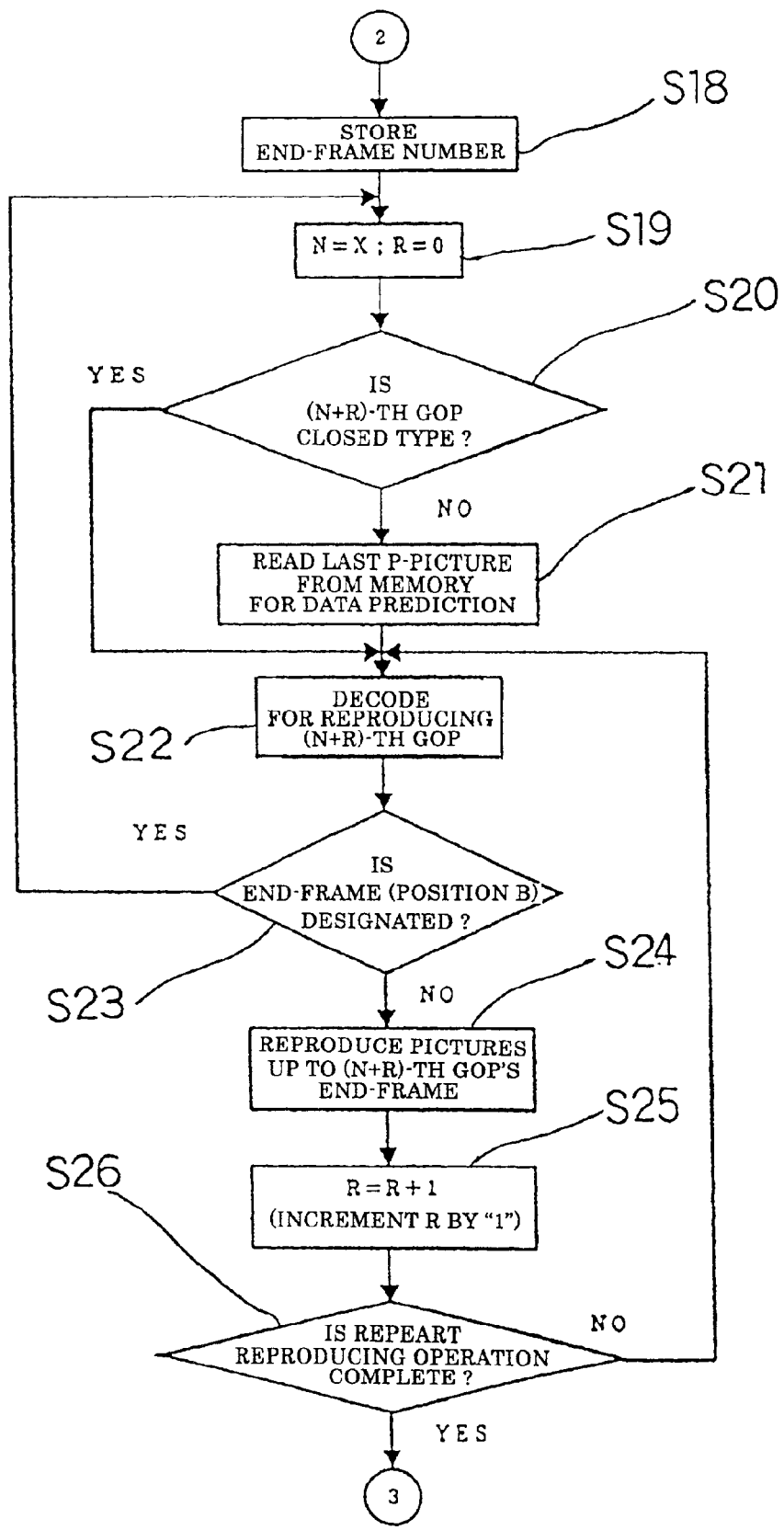
FIG. 6 illustrates a sub-routine in the operation of the coded picture data reproducing apparatus of the first embodiment.

FIG. 6 illustrates a second sub-routine in the operation of the coded picture data reproducing apparatus of the first embodiment.

These main routine, first sub-routine and second sub-routine are connected by the nodes 1 to 3.

Further, a program showing in the flowchart is installed in a microprocessor Mp, as shown in a block diagram of FIG. 1. The microprocessor Mp controls the optical pickup Pu, the MPEG decoder Mpg or the decoded P-picture data memory Dmp through a command according to the processing and/or determination steps, as shown in the flowchart, so as to repetitively reproduce the picture between the start-frame and the end-frame designated by the key input system Kb.

In FIG. 4, S1 denotes the "START" step of the program.

Following the "START" step S1, the process goes to step S2.

In step S2, an initial value is substituted for the arguments N and R to search the MPEG encoded picture data in every GOP which is recorded on the optical disc D.

The values N and R are stored in the internal memory of the microprocessor Mp.

In step S2, the value N is set to the positive integer larger than 0, and the value R is set to −1.

Next, the process goes to step S3.

In step S3, the optical pickup Pu is driven by the optical pickup drive motor Pm in order to search and obtain the picture data belonging to the (N+R)-th GOP.

Then, the picture data is decoded per each frame of the GOP in the MPEG decoder Mpg. After that all of the decoded picture data are temporarily stored in the frame buffer Fb.

To start the reproduction of the picture data, the picture data of the frames of the pictures are forwarded to the video D/A converter Vda on the rear in the reproducing sequence.

The video D/A converter Vda starts the conversion of the input picture data into the analog video signal, and then sequentially forwards the converted video signal to the monitor Mnt via the signal line.

The monitor Mnt starts the reproduction of the picture by the input video signal.

Since the value N is set to the positive integer larger than 0, and the value R is set to −1 in the previous step S2, the picture data belonged in the (N−1)-th GOP will be fetched first.

Next, the process goes to step S4.

In step S4, at the reproducing time of the (N+R)-th GOP it is discriminated whether or not the start-frame (position As) is designated.

The start-frame (position A) is designated by pressing a start position designation key mounted through a key-input system Kb.

In case that the determination in step S4 results in "YES", i.e., when it is determined that there is a designation of the start-frame (position A), the process goes to the first sub-routine, as shown in FIG. 5, via the node 1.

However, in case that the determination in step S4 results in "NO", i.e., when it is determined that there is no designation of the start-frame (position A), the process goes to step S5.

In step S5, the microprocessor Mp makes controls to overwrite the P-picture data corresponding to the frame which will be reproduced last among the decoded picture data corresponding to the frame in the (N+R)-th GOP on the decoded P-picture data memory Dmp.

That is, in step S5, a P-picture data corresponding to the frame which will be reproduced last in the frames in GOP is always updated in each GOP and recorded to the decoded P-picture data memory Dmp.

Following step S5, the process goes to step S6.

In step S6, the argument R is incremented by 1 in order to search and obtain the picture data belonging to the next GOP.

Since the value R is set to the value −1 in step S2, the picture data fetched next will be belonged in the N-th GOP.

As described above, the value R is stored in the internal memory of the microprocessor Mp.

The microprocessor Mp obtains the picture data belonging to the GOP based on the argument R by the optical pickup Pu Next, the process goes to step S7.

In step S7, it is discriminated whether or not the reproducing operation of the coded picture data reproducing apparatus is completed.

The judgment if the reproducing operation is completed or not is determined whether or not the end key mounted through a key-input system Kb has been pressed.

If it is determined that the STOP-key has been pressed, and the result of the determination is YES, that is, the reproducing is completed, the process goes to the "END" step S8 and become complete.

However, in case that the determination results in "NO", i.e., when it is not determined that the STOP-key has been pressed, and that the reproducing is not complete, the process of step S3 is again executed.

Here, the processings from step S3 to step S7 are repetitively executed till it is discriminated that the reproducing processing is completed in step S7, thus the picture data belonging to GOP is sequentially fetched and the fetched picture data is sequentially reproduced per each frame.

Steps from S3 to S7 form a conditional loop for consecutively reproducing the GOPs.

In this consecutive reproduction, the optical pickup Pu which is controlled by the microprocessor Mp obtains the data as tracing the data truck formed on the truck of disc D.

The picture data belonging to each GOP is sequentially recorded on the data truck. Thus, if the optical pickup Pu traces the data truck, the coded picture data reproducing apparatus obtains the picture data belonging to each GOP sequentially inevitably so as to carry out the successive reproducing.

Next, the first sub-routine of this program will be explained in reference to FIG. 5.

The first sub-routine is programmed to execute the process following the main-routine, as shown in FIG. 4, via the node 1.

The process of step S9 is carried out when the determination in step S4 results in "YES", i.e., when it is determined that there is a designation of the start-frame (position A).

Here, the picture data of a frame designated as a start-frame is a picture data corresponding to a B-picture data reproduced in preceding an I-picture in a GOP containing the start-frame.

In step S9, a decoded P-picture data which corresponds to a frame reproduced last in a GOP which is reproduced just before a GOP wherein a picture data corresponding to a designated start-frame is contained is stored in the decoded P-picture data memory Dmp.

The microprocessor Mp controls the decoded P-picture data memory Dmp to hold and store the decoded P-picture data.

Next, the process goes to step S10.

In this time, the microprocessor Mp makes the number of the designated start-frame be stored in its internal memory.

The frame number is a relative information showing the position of the frame in the GOP.

In next step S11, the microprocessor Mp makes the number of the GOP containing the picture data of the start-frame be stored in its internal memory.

In the program, the number of the GOP containing the start-frame is defined as X.

Then, by substituting the value N+R for the value X, the number of the GOP containing the start-frame is stored in an internal memory of the microprocessor Mp.

In this time, an address that is used for searching the picture data belonging to the GOP is also stored in the internal memory by linked to the GOP number, so that the address is quotated based on the GOP number.

Following step S11, the microprocessor Mp forwards the process to step S12.

In step S12, it is discriminated whether or not the (N+R)-th GOP wherein the picture data of the designated start-frame is contained is a closed type.

Whether the GOP is closed type or not is determined by the value of the GOP type flag that is the control data applied to each GOP is "1" or "0", as shown in FIG. 2.

An entire picture data belonging to the closed type GOP is able to be decoded without the use of the picture data of the frame belonging to other GOP.

The picture data belonging to the non-closed type GOP is not able to be decoded unless using already decoded P-picture data corresponding to last frame that is reproduced last in the GOP reproduced just before the GOP containing the B-picture to be decoded in order to decode the B-picture corresponding to the frame reproduced in preceding the frame corresponding to the I-picture.

Here, if the result of determination of the GOP type is YES, that is, if the microprocessor Mp determines the GOP type a closed type GOP based on the GOP type flag, the process goes to step S13. If the result if NO, that is, if the GOP is not a closed type, the process goes to step S14.

In step S13, the microprocessor Mp sets the GOP type flag to "1".

In step S14, the microprocessor Mp sets the GOP type flag to When completed the processes in both steps S13 and S14, the microprocessor Mp carries out the determination process in step S15.

In step S15, it is discriminated whether or not the end-frame (position B) is designated at reproducing time of picture data belonging to the (N+R)-th GOP.

The end-frame (position B) is designated by pressing an end position designation key mounted through a key-input system Kb In case that the determination in step S15 results in "YES", i.e., when it is determined that there is a designation of the end-frame (position B), the process goes to the second sub-routine, as shown in FIG. 6, via the node 2.

However, in case that the determination in step S15 results in "NO", i.e., when it is determined that there is no designation of the end-frame (position B), the process goes to step S16.

In step S16, the argument R is incremented by 1 in order to search and obtain the picture data belonging to the next GOP.

In step S17 following step S16, the microprocessor Mp drives the optical pickup Pu by the optical pickup drive motor Pm so as to search and obtain the picture data belonging to the (N+R)-th GOP.

Here, since the value R has been incremented by "1", the fetched picture data belongs to another GOP that follows the GOP wherein the start-frame belongs.

Then, the picture data in the GOP is decoded in every frame by the MPEG decoder Mpg. All of the decoded frame data are temporarily stored in the frame buffer Fb.

To start the reproduction of the picture data, the frames of the pictures are forwarded to the video D/A converter Vda on the rear in the reproducing sequence.

Then, the video D/A converter Vda starts the conversion of the input picture into the analog video signal, and then it sequentially displays the converted video signal as a picture on the monitor Mnt via the signal line.

Accordingly, the monitor Mnt displays the pictures of the fetched GOPs based on the input video signals.

Following step S17, the process reverts to step S12.

That is, a series of the processes across steps S12 to S17 is repetitively executed and thus the picture data belonging to GOP on the data truck are sequentially reproduced, unless the end-fame is designated through the key input system Kb and the microcomputer Mp determines in step S15 to that an end-frame has been designated,.

Steps from S12 to S17 form a conditional loop for consecutively reproducing the GOPs.

As mentioned above, at the successive reproducing time of GOP, the optical pickup Pu which is controlled by the microprocessor Mp obtains the picture data as tracing the data truck formed on the truck of disc D.

Next, the second sub-routine of this program will be explained in reference to FIG. 6.

The second sub-routine is programmed to execute the process following the first sub-routine, as shown in FIG. 5, via the node 2. That is, the second sub-routine is a program for the repetitive reproduction to be executed when designated the end-frame (position B).

The process of step S18 is carried out when the determination in step S15 results in "YES", i.e., when it is determined that there is a designation of the end-frame (position B).

In this time, the microprocessor Mp makes the number of the designated start-frame be stored in its internal memory.

The frame number is a relative information showing the position of the frame in the GOP.

The microprocessor Mp carries out the process of step S19 after the process of step S18 has completed.

In step S19, the microprocessor Mp substitutes the value X, i.e., the number of the GOP to which the picture data of the start-frame stored in the internal memory in step S11 belongs for the argument N.

Further, the microprocessor Mp substitutes the value 0 for the argument R so as to decode the picture data sequentially from the picture data belonging to the GOP containing the start-frame.

Further, the microprocessor Mp quotates the address of GOP wherein the picture data of a start-frame is contained based on the argument N+R, and it moves the optical pickup Pu to the record position of the picture data belonging to the GOP on the disc based on the address so that the microprocessor Mp searches and obtains the picture data belonging to the GOP wherein the picture data of the start-frame belongs.

After processing in step S19, the microprocessor Mp carries out the judging processing in step S20.

In step S20, it is discriminated whether or not the GOP wherein the picture data of the start-frame belongs, that is, the (N+R)-th GOP is a closed type.

Whether the (N+R)-th GOP is closed type or not is determined by the value 1 or 0 of the GOP type flag set in the internal memory of the microprocessor Mp in step S13 or steps 14.

It is discriminated that if the GOP type flag stored in the internal memory of the microprocessor Mp is "1" the GOP wherein the picture data of the start-frame belongs is a closed type, and if the GOP type flag is "0" the GOP is not a closed type.

Here, if the result of the determination of the GOP type is YES, that is, the microprocessor Mp determines the GOP as a closed type based on the GOP type flag, the process goes to step S22.

The result YES means the GOP containing the picture data of a start-frame is a closed type.

The picture data corresponding to all of the frames in a closed type GOP is able to be decoded by only the picture data corresponding to the frame in the GOP.

The microprocessor Mp decodes the picture data of the (N+R)-th GOP, that is, the GOP containing the picture data of the start-frame by controlling the MPEG decoder Mpg. All of the decoded frame data are temporarily stored in the frame buffer Fb.

To start the reproduction of the picture data, the picture data of the frames temporarily stored in the frame buffer Fb are forwarded to the video D/A converter Vda on the rear in the reproducing sequence from the B-picture data corresponding to the start-frame in the GOP.

On the other hand, if the result if NO, that is, the GOP is not a closed type, the process goes to step S21.

In step S21, the microprocessor Mp controls the decoded P-picture data memory Dmp to yield the recorded P-picture data.

Following step S21, the process goes to step S22.

In step S22, the microprocessor Mp controls the MPEG decoder Mpg to decode the B-picture data which is reproduced between the frame corresponding to the P-picture data which is read out from the decoded P-picture data memory Dmp and the frame corresponding to the I-picture data in the GOP containing the picture corresponding to the designated start-frame by using the I-picture and P picture data.

The control operation of the microprocessor Mp will be explained hereinafter in detail in reference to FIG. 17.

N in step S11 denotes the number X of the GOP containing a recorded start-frame.

Then, the value R at the start-frame designation time is defined "0", the start-frame is defined an position A frame in the N'th GOP, and the picture data is defined a position B data B1.

Further, a frame picture data following the B-picture data B1 is defined a picture data B2.

Furthermore, a P-picture data temporarily stored in the decoded P-picture data memory Dmp is defined a P-picture data Pp reproduced last in the (N−1)-th GOP that is reproduced just before the N-th GOP.

Then, the value R at the end-frame designation is set up to the positive integer equal to or larger than 1, the end-frame is defined as a position B in the (N+R)-th GOP, which picture data is defined a P-picture data Pr.

When the P-picture data Pr in the position B frame is decoded and displayed on the monitor Mnt, then the position B frame is designated as an end-frame by the key input system Kb, the microprocessor Mp quotates an address for searching the picture data belonging to the N-th GOP, which is stored in the internal memory by linked to the GOP number containing a start-frame (position A) in step S11, and it makes an optical pickup Pu move to the position where the picture data is recorded based on the address for searching the picture data belonging to the N-th GOP so as to obtain the picture data belonging to the N-th GOP.

The microprocessor Mp controls the MPEG decoder Mpg to decode the B-picture data B1 of a start-frame and the B-picture data B2 that is reproduced following the B-picture data B1 by using the P-picture data Pp corresponding to a frame which are reproduced last in the (N−1)-th GOP, which are output from the decoded P-picture data memory Dmp and the B-picture data B1 of a start-frame.

Further, the microprocessor Mp controls the MPEG decoder Mpg to decode the picture data of other P and B-picture frames in the N-th GOP.

Then, the decoded picture data are temporarily stored in a frame buffer Fb.

To start the repetitive reproduction of the picture data, the picture data of the frames temporarily stored in the frame buffer Fb are forwarded to the video D/A converter Vda on the rear in the reproducing sequence from the B-picture data corresponding to the start-frame in the GOP.

Accordingly, by fetching the picture data in GOP that contains the start-frame, the repetitive reproduction is executed from the picture corresponding to the start-frame.

After the process of step S22, the microprocessor Mp carries out the process of step S23.

In step S23, the picture data corresponding to an end-frame (position B), that is a P-picture data Pr is fetched by the optical pickup Pu, and it is discriminated whether or not the reproducing is completed.

In case that the determination in step S23 results in "YES", i.e., when it is determined that the reproduction of the picture of the end-frame is complete, the process reverts to step S19.

In this time, the microprocessor Mp again makes the optical pickup Pu move to search the picture data belonging to the N-th GOP containing the start-frame.

The picture data belonging to the N-th GOP searched by the optical pickup are decoded in the MPEG decoder, and forwarded to the video D/A converter sequentially from the picture data corresponding to the start-frame again.

Steps from S19 to S23 form a conditional loop, wherein the picture data belonging to GOP is fetched by the optical pickup Pu sequentially, and it is decoded in the MPEG decoder Mpg, then it is reproduced in the monitor Mnt so as to reproduce the picture between the start-frame and the end-frame repetitively.

However, in case that the determination in step S23 results in "NO", i.e., when it is determined that the reproduction of the picture of the end-frame is not complete, the process goes to step S24.

In this time, the microprocessor Mp outputs the picture data till the last frame in the (N+R)-th GOP which is temporarily stored in the frame buffer Fb and have been reproduced to the video Da converter Vda successively in the reproducing sequence, so as to complete the reproduction of all frames in the (N+R)-th GOP.

In step S25, the microprocessor Mp counts up the argument R for fetching the picture data of GOP, and stores the value R in the internal memory.

After the process of step S25, the microprocessor Mp carries out the process of step S26.

In step S26, it is discriminated whether or not the repetitive reproduction is complete.

Specifically, the operation for determining whether or not the repetitive reproduction STOP-key which is provided on the key-input system Kb has been pressed is executed by the microprocessor Mp.

Here, when it is determined that the repetitive reproduction is not complete, the process again goes to step S22.

In this time, in step S22, since the value R has been incremented by "1", the reproduced picture data belongs to the following GOP. The reproduction of the frame belonging to the GOP is started.

That is, a series of steps S22 to S26 form a conditional loop for maintaining the repetitive reproduction condition.

The repetitive reproduction will be continued unlessl the microprocessor Mp determines the repetitive reproduction end—key mounted through a key-input system Kb has been pressed.

In step S26, when the microprocessor Mp determines that the repetitive reproduction is complete, the process returns to the main routine of FIG. 4 for the normal reproduction procee from step S3 to step S7, via the node 3.

Here, the operation of the conventional coded picture data reproducing apparatus in case that the B-picture frame which is reproduced in preceding the I-picture in the GOP is designated as a start-frame (position A), then the end-frame (position B) is designated will be explained in reference to FIG. 7.

Figure 7:
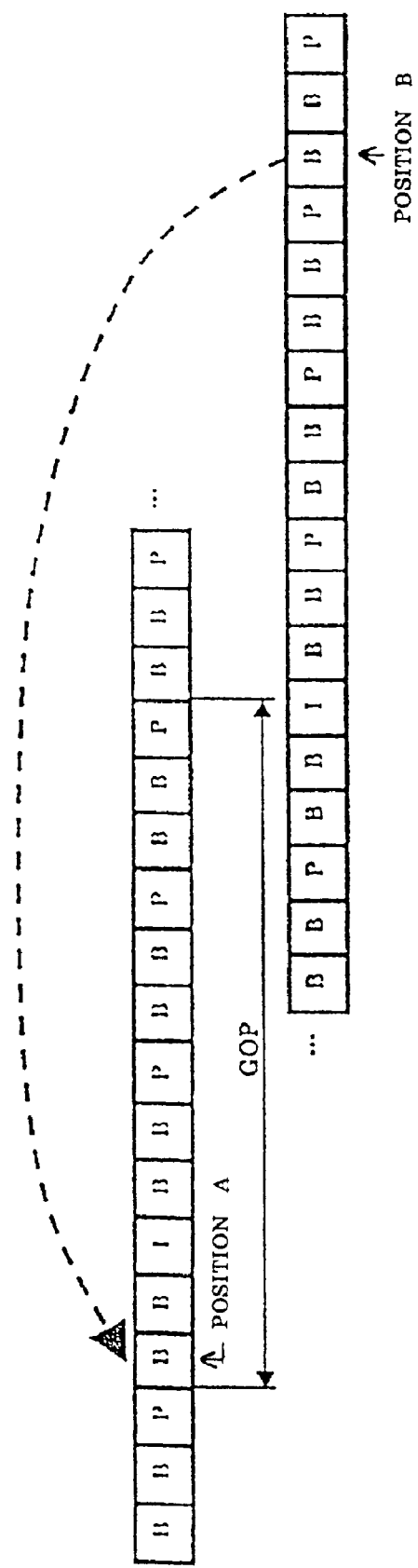
FIG. 7 illustrates the repetitive reproduction operation of the coded picture data reproducing apparatus of the first embodiment.

FIG. 7 illustrates the repetitive reproduction operation of the coded picture data reproducing apparatus according to the first embodiment In FIG. 7, an position A is a start-frame, and a B-picture data reproduced in preceding an I-picture in GOP.

Position B is an end-frame.

When the start-frame (position A) and the end-frame (position B) are designated, the optical pickup Pu serches the picture data belonging to GOP containing the start-frame (position A) so as to obtain the picture data.

In this time, a B-picture data reproduced in preceding an I-picture in a GOP containing a start-frame of position A by using the I-picture data and a P-picture data which reproduced last of the picture data corresponding to a frame belonging to a GOP which reproduced just before the GOP containing the start-frame of position A. Then, the picture data are output to the video D/A converter Vda from the start-frame in a reproducing sequence.

The, the monitor Mnt displays a picture on a screen from the designated start-frame picture of position A. As illustrated by the broken-arrow line in FIG. 7, the pictures from the start-frame (position A) to the end-frame (position B) are repetitively reproduced.

Now, the second embodiment according to the present invention will be explained in reference to accompanying drawings FIGS. 8 to 11.

Figure 8:
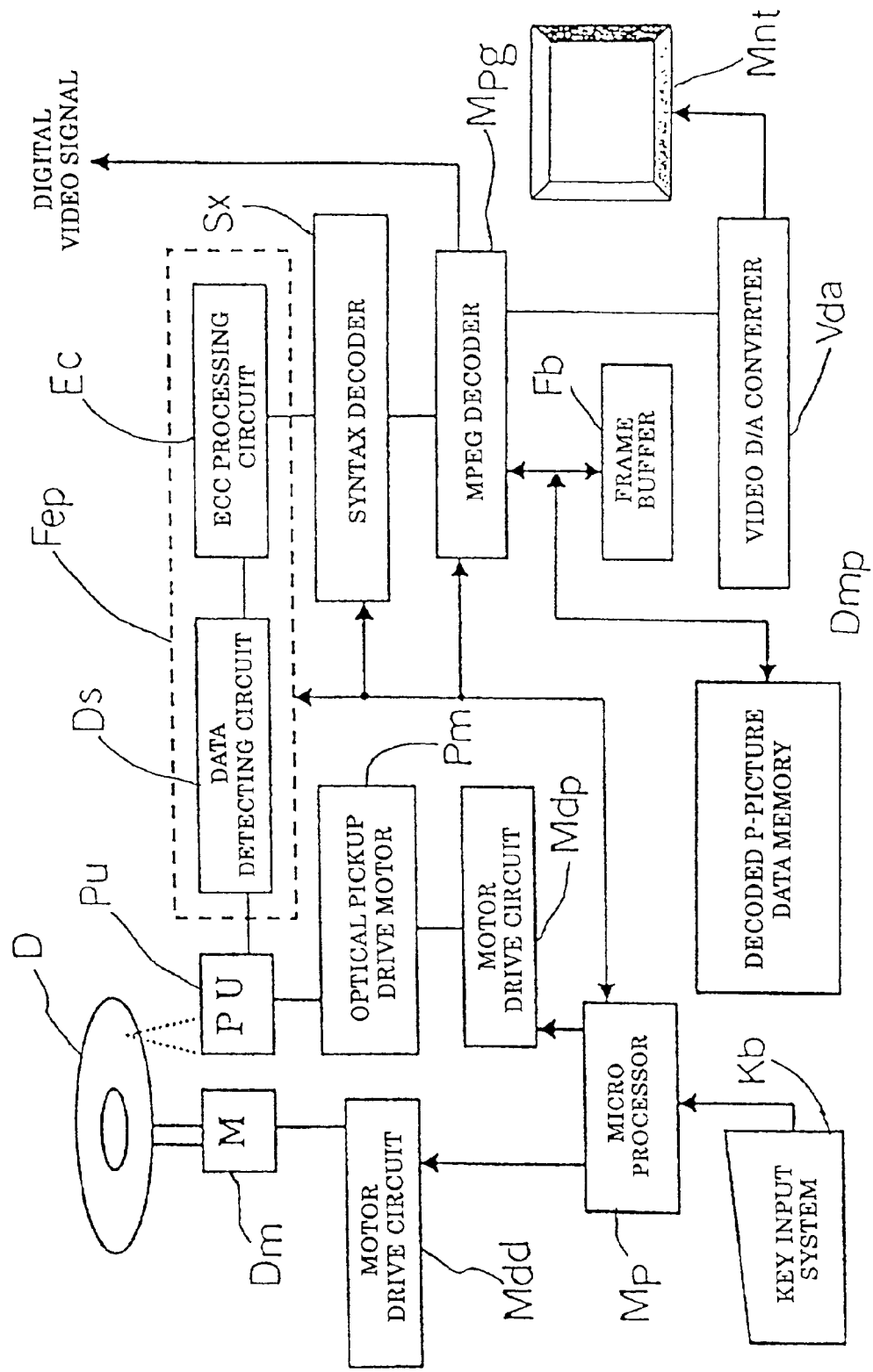
FIG. 8 is a block diagram showing a second embodiment of the coded picture data reproducing apparatus.

FIG. 8 is a block diagram showing a coded picture data reproducing apparatus of the second embodiment.

The coded picture data reproducing apparatus, as shown in FIG. 8, is comprised of a microprocessor Mp, a key input system Kb, a motor drive circuit Mdd, a disc drive motor Dm, a motor drive circuit Mdp, an optical pickup drive motor Pm, an optical pickup Pu, a syntax decoder Sx, an MPEG decoder Mpg, a frame buffer Fb, a video D/A converter Vda and a front-end processor Fep.

The front-end processor Fep is comprised of a data detecting circuit Ds and an ECC processing circuit Ec.

A turntable (not shown) for loading thereon the optical disc D is fixed to the rotor shaft of the disc drive motor Dm. The turntable is driven by the rotation of the rotor shaft and thus rotates the optical disc D loaded thereon.

The video D/A converter Vda has a video signal output terminal which is capable of mechanically and electrically connecting to a signal line.

The signal line is able to be both mechanically and electrically connected to a video input terminal of the monitor Mnt with a display device such as a liquid crystal device or a cathode-ray tube. The video D/A converter Vda forwards the video signals to the monitor Mnt via the signal line.

The monitor Mnt displays a picture image on its display screen according to the input video signal.

Further, the MPEG decoder Mpg has an output terminal which is capable of outputting a digital video signal.

The microprocessor Mp is connected to the key input system Kb, the motor drive circuit Mdd and the motor drive circuit Mdp via the signal line.

The microprocessor Mp is connected to the front-end processor Fep, the syntax decoder Sx and the MPEG decoder Mpg via the two-way bus line.

Further, the microprocessor Mp controls blocks connected to the microprocessor Mp according to the command provided through a key-input system Kb.

For instance, when the user command for directing a reproduction of the picture data recorded on the optical disc D is forwarded from the key input system Kb to the microprocessor Mp, the microprocessor Mp forwards operation signals to the motor drive circuit Mdd and the motor drive circuit Mdp for making them rotate the optical disc D.

The motor drive circuits Mdd and Mdp receive the operation signals from the microprocessor Mp and then forward driving signals to a disc drive motor Dm and an optical pickup drive motor Pm respectively coupled thereto.

The disc drive motor Dm rotates the optical disc D at the rotation speed according to the driving signal.

The optical pickup drive motor Pm moves the optical pickup Pu to the optical disc D in the radius direction according to the driving signal so that the optical pickup Pu search the picture data to be reproduced.

The optical pickup Pu irradiates a laser beam to the signal recording surface of the optical disc D so as to obtain the record signal based on the reflection light.

The disc is recorded thereon picture data and addresses for indicating the record positions of the picture data. And the optical pickup Pu is moved according to the address to search the picture data to be reproduced.

The optical pickup Pu searches the picture data to be reproduced, then it obtains the record signal corresponding to the picture data on the disc.

The record signal picked up by the optical pickup Pu is forwarded to the data extracting circuit Ds which is contained in the front-end processor Fep, which is located in rear of the optical pickup Pu.

The record signal is a wave-formed signal called a RF signal. The data extracting circuit Ds slices the RF signal at a specific timing so as to generate a rectangular wave-formed data signal.

Further, the data extracting circuit Ds forwards the data signal to the ECC processing circuit Ec on the rear.

The data signal is record by executed a NRZI (Non Return to Zero Inverted) modulation at recording time.

The ECC processing circuit Ec extracts a data signal from the invert interval of the data signal according to the NRZI demodulation rule, and performs the error correction of the data in each ECC block, then forwards the data signal to the syntax decoder Sx located in rear of the circuit Ec.

The syntax decoder Sx extracts the control data from the input data signal according to the command that is output from the microprocessor Mp. Further the syntax decoder Sx extracts the picture data and then forwards the picture data to the MPEG decoder Mpg located in rear of the decoder Sx.

The picture data is coded in the MPEG (Moving Picture Expart Group) system. The picture data is decoded in the MPEG decoder Mpg by the command output from the microprocessor Mp according to the decoding algorithm of pre-determined MPEG system.

A frame buffer Fb, which is connected to the MPEG decoder Mpg via the two-way bus line works as a work memory for temporarily storing the picture data when the MPEG coded picture data is decoded.

The picture data temporarily stored in the frame buffer Fb is added a synchronizing data for every frame, and then forwarded to the video D/A converter Vda located in rear of the MPEG decoder Mpg.

Or the MPEG decoder Mpg could output the picture data from the digital video signal output terminal as the digital video signal.

The video D/A converter Vda converts the input picture data into the analog video signal.

Then, the video D/A converter Vda forwards the video signal which is converted to the analog signal to the monitor Mnt located in rear of the converter Vda, via the signal line.

The monitor Mnt displays the picture image on a display device such as a liquid crystal device or a cathode-ray tube according to the input video signal.

In the coded picture data reproducing apparatus according to the present invention, the picture image is reproduced in the way as mentioned above.

In the coded picture data reproducing apparatus of this embodiment, a decoded B-picture data memory Dmb is newly mounted for temporarily storing the decoded a bi-directional predictive coded picture data (B-picture data) which is reproduced in preceding an intraframe coded picture data (I-picture data) in GOP among the picture data coded by the MPEG system.

The decoded B-picture data memory Dmb is comprised of a re-writable semiconductor memory.

The decoded B-picture data memory Dmb is coupled to the tow-way bus for connecting the MpEG decoder Mpg and the frame buffer Fb.

A B-picture data that are temporarily stored in the decoded B-picture data memory Dmb have been decoded in the MPEG decoder Mpg.

The B-picture data stored in the decoded B-picture data memory Dmb is updated in each GOP reproduced.

Further, the B-picture data temporarily stored in the decoded B-picture data memory correspond to a frame which is reproduced between a frame corresponding to an I-picture data in the GOP during being decoded and a frame corresponding to a P-picture data which is reproduced last in already decoded GOP reproduced just before the GOP containing the B-picture data. And the B-picture data correspond to a frame reproduced in preceding the I-picture data.

Here, the decoded B-picture data memory Mdb will be explained in reference to FIG. 17 in detail.

Figure 17:
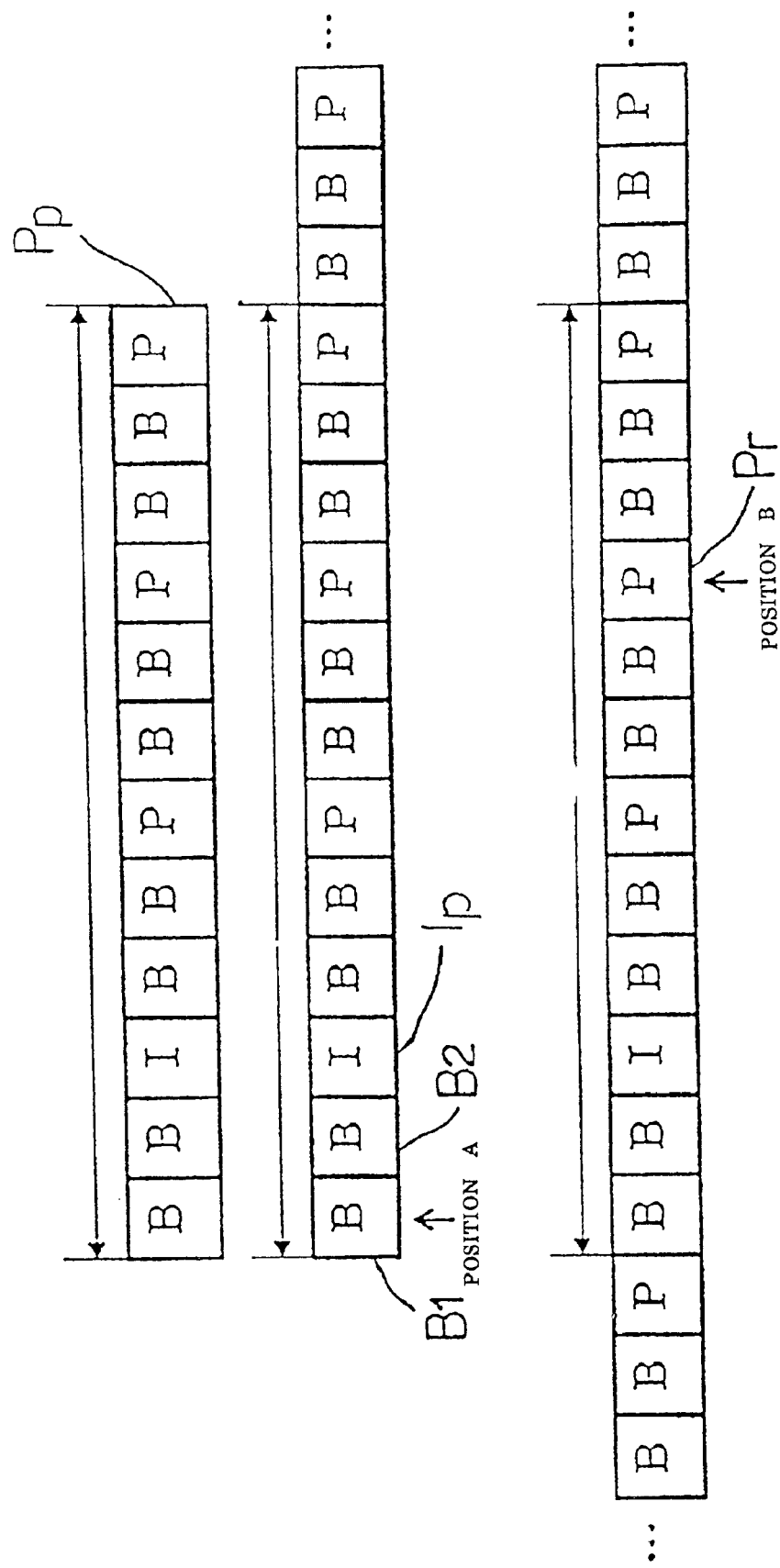
FIG. 17 illustrates a data structure of the picture data in MPEG system.
Figure 18:
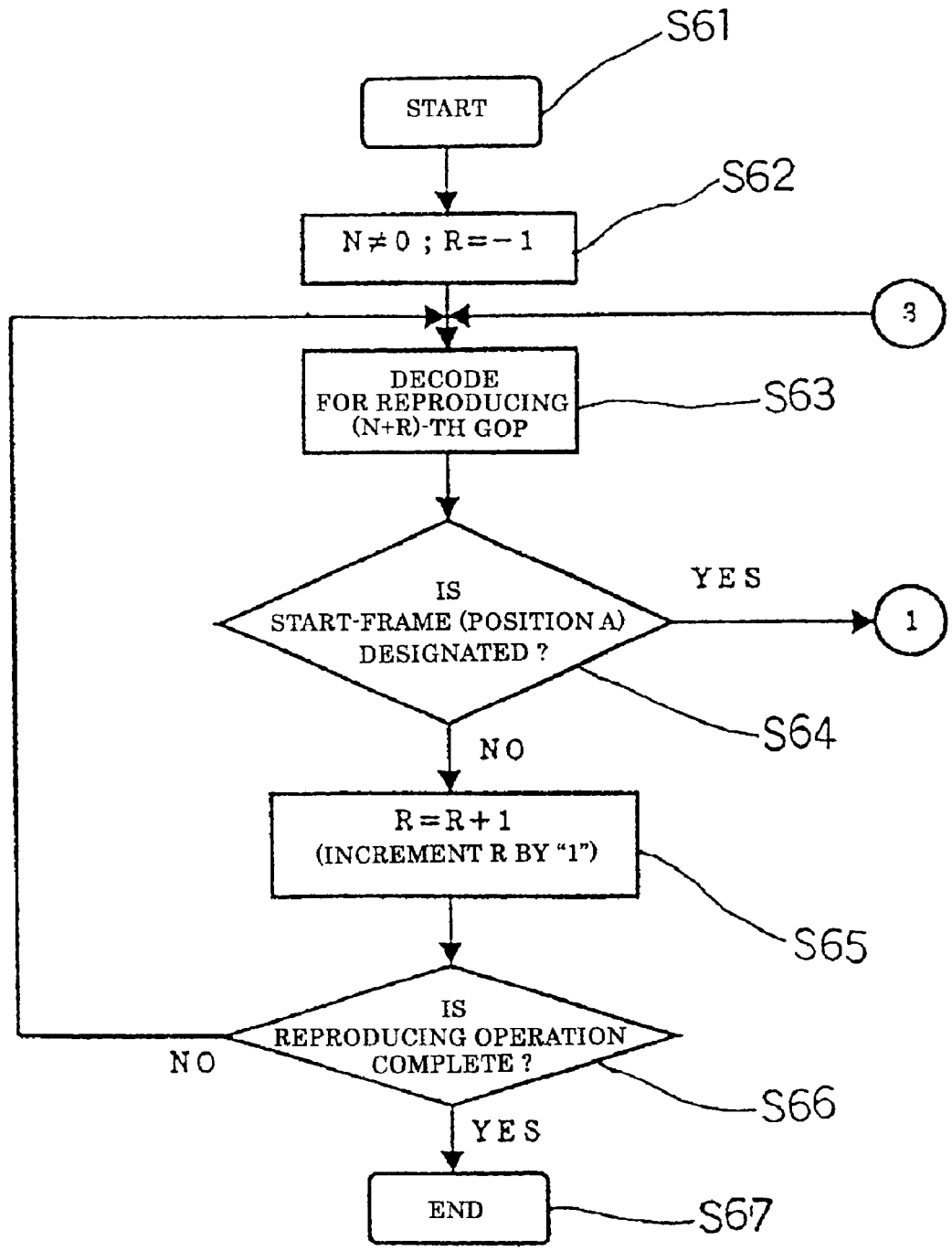
FIG. 18 illustrates a main routine in the operation of the conventional coded picture data reproducing apparatus.
Figure 19:
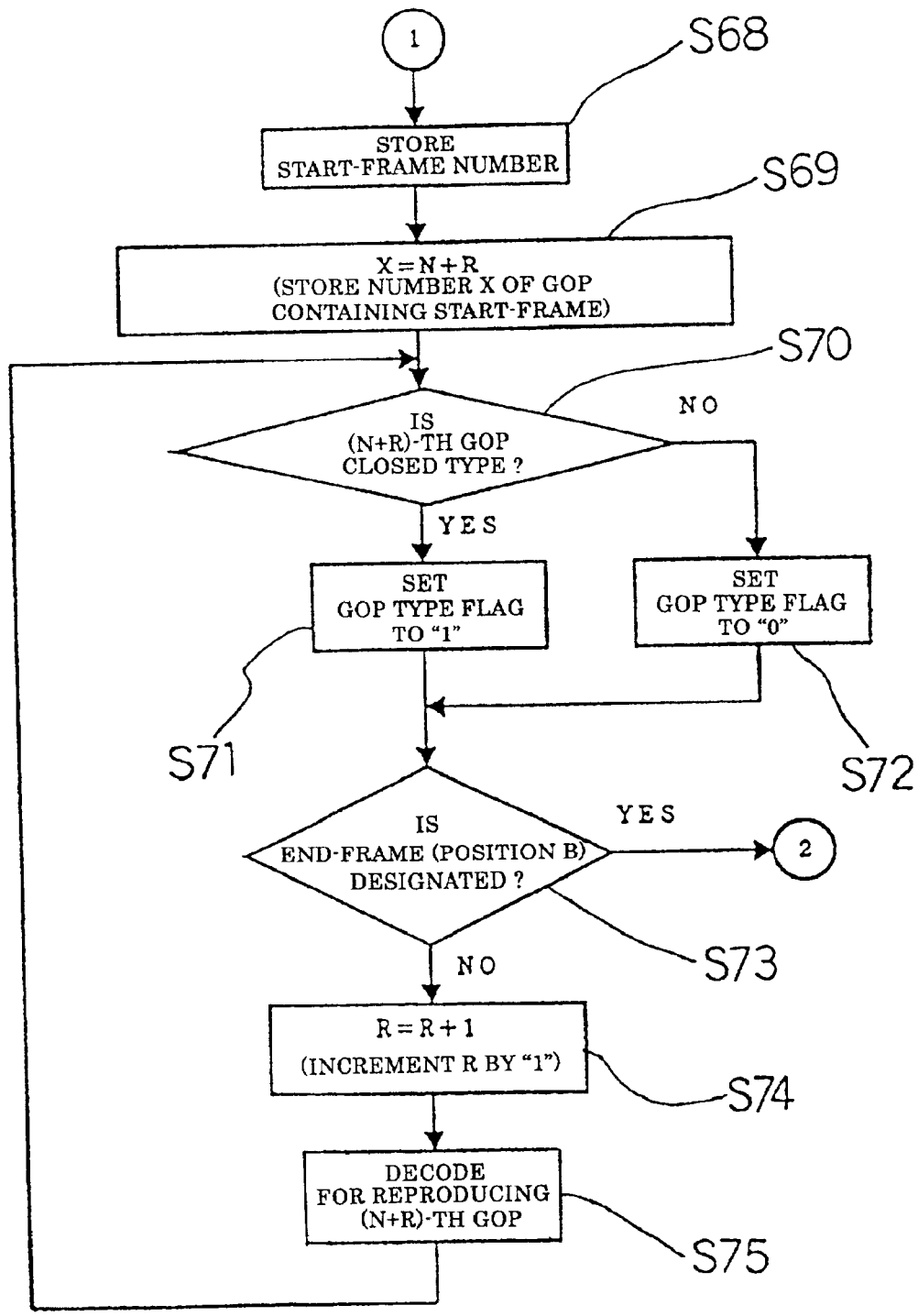
FIG. 19 illustrates a first sub-routine in the operation of the conventional coded picture data reproducing apparatus.
Figure 20:
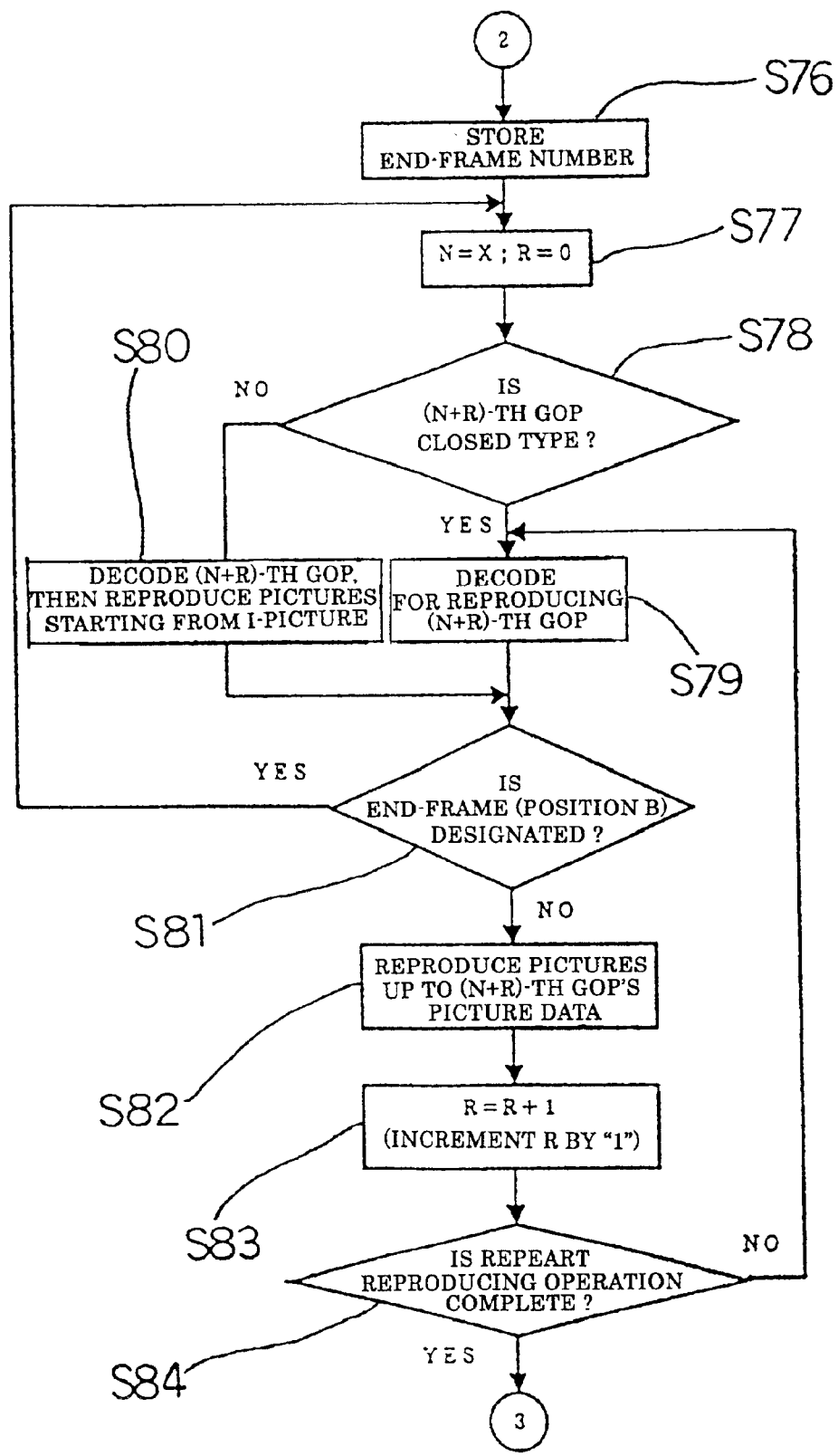
FIG. 20 illustrates a second sub-routine in the operation of the conventional coded picture data reproducing apparatus.
Figure 21:
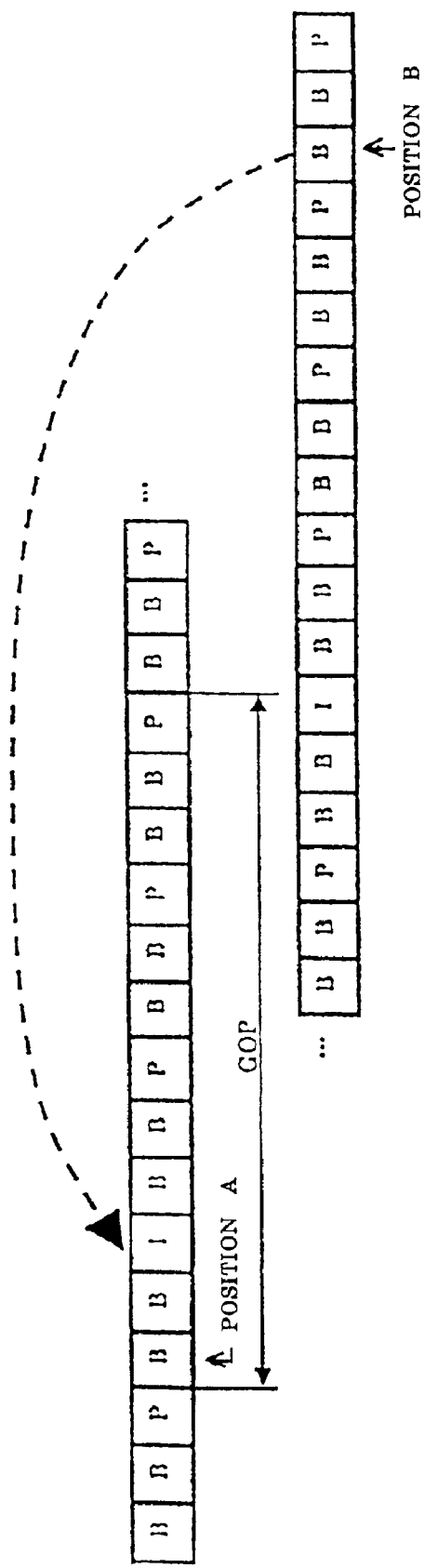
FIG. 21 illustrates an operation of the conventional coded picture data reproducing apparatus.

In a configuration of a picture data in an MPEG system, as shown in FIG. 17, the picture data of the frame reproduced in preceding a frame corresponding to the I-picture data are B-picture data B1 and B2.

As mentioned above, in the coded picture data reproducing apparatus according to the embodiment, the decoded B-picture data memory Mdb has two framefuls of coding capacity in order to temporarily store the decoded B-picture data.

However, there is no limit for the number of frames corresponding to the B-picture data in the MPEG standard, and also there might be frames which corresponding to more than two B-picture data in the GOP.

Accordingly, the capacity of the decoded B-picture data memory Dmb may be set to two or more framefuls of capacity. That is, the capacity can be set properly amount according to the specifiction of the apparatus.

The B-picture data stored in the decoded B-picture memory Dmb is updated for every reproduced GOP. And it is overwritten by the decoded B-picture data that correspond to a frame reproduced in preceding a frame corresponding to the I-picture in the same memory space.

Here, the decoded B-picture data memory Dmb is set its capacity for two of the frames. However, in the repetitive reproduction, it may memorizes only a decoded B-picture corresponding to a frame which contains a start-frame and also which is reproduced after the start-frame among the frames reproduced in preceding the frame corresponding to the I-picture data.

Further, in FIG. 17, if the B-pictured data of an position A start-frame is set to a B-picture data B2, the decoded B-picture data memory Dmb may memorize only B-picture data B2.

Furthermore, if the B-picture data B2 corresponds to a start-frame and the picture data which are reproduced following the frame of B-picture data B2 and preceding the I-picture data are also B-picture data, these B-picture data are temporarily stored in the decoded B-picture data memory Dmb.

Next, the operation of the coded picture data reproducing apparatus of the second embodiment, as shown in FIG. 8, will be explained in reference to FIGS. 9 to 11.

Figure 9:
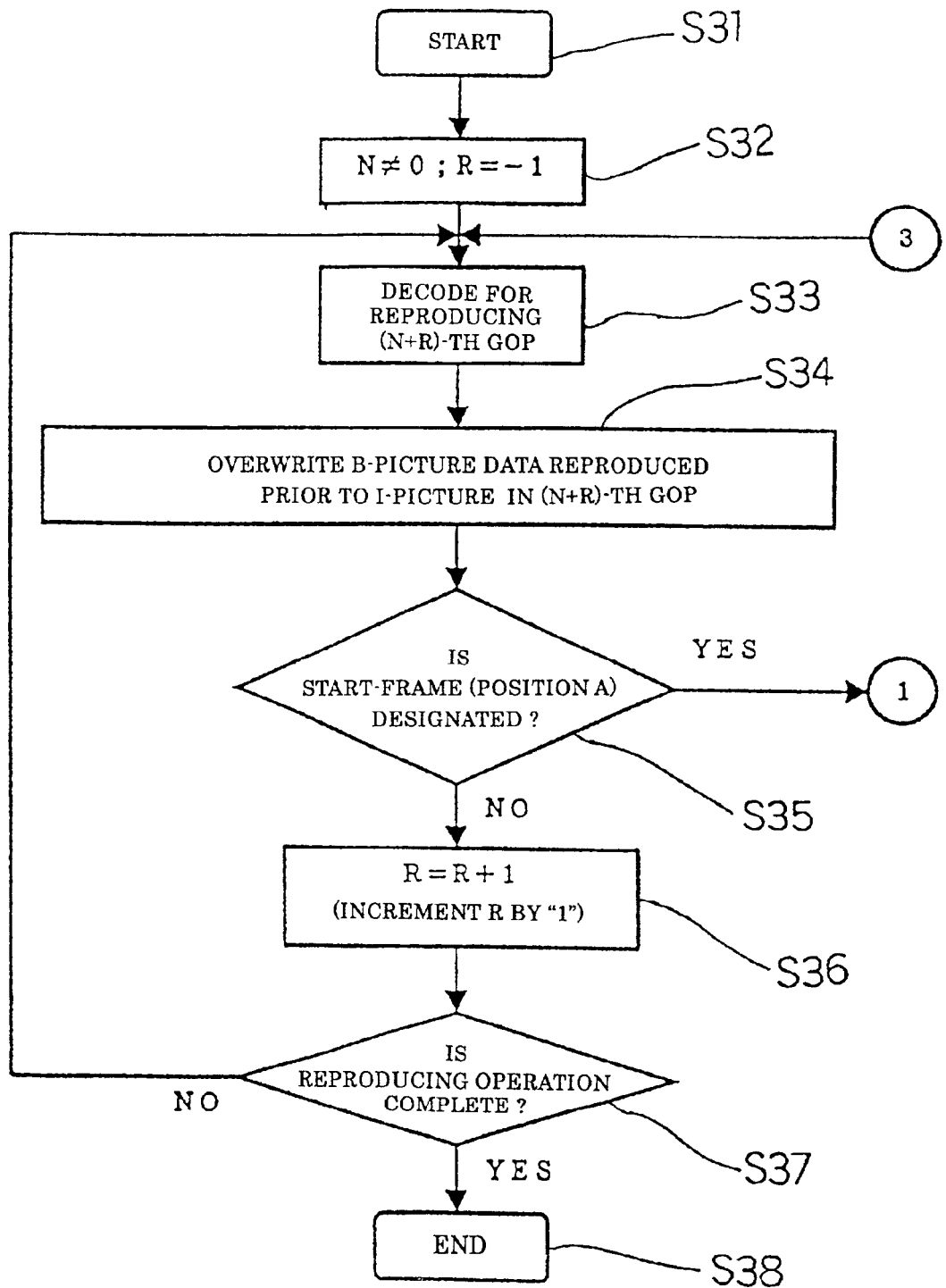
FIG. 9 illustrates a main routine in the operation of the coded picture data reproducing apparatus of the second embodiment.

FIG. 9 illustrates a main routine in the operation of the coded picture data reproducing apparatus of the first embodiment.

Figure 10:
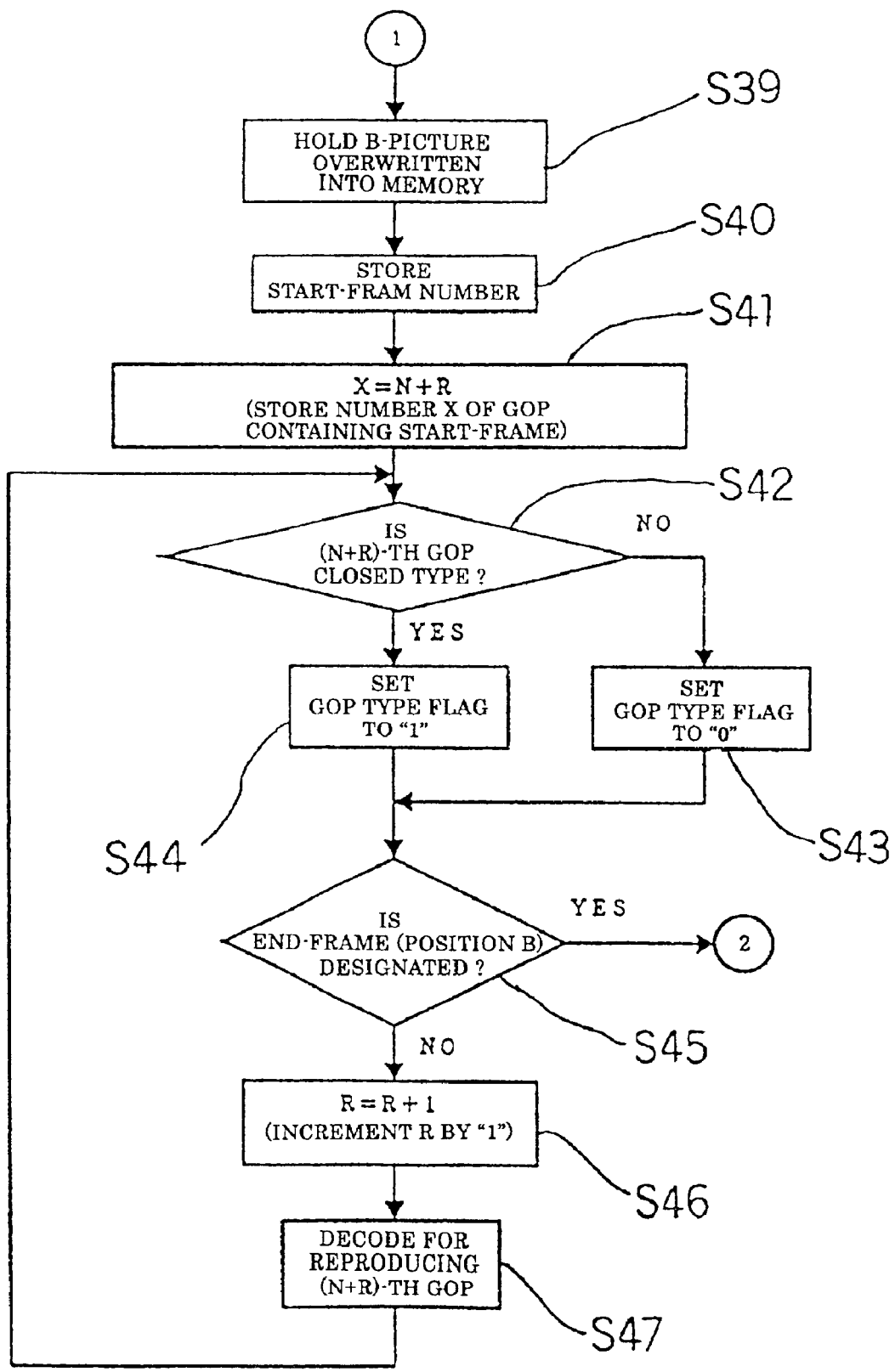
FIG. 10 illustrates a first sub-routine in the operation of the coded picture data reproducing apparatus of the second embodiment.

FIG. 10 illustrates a first sub-routine in the operation of the coded picture data reproducing apparatus of the first embodiment.

Figure 11:
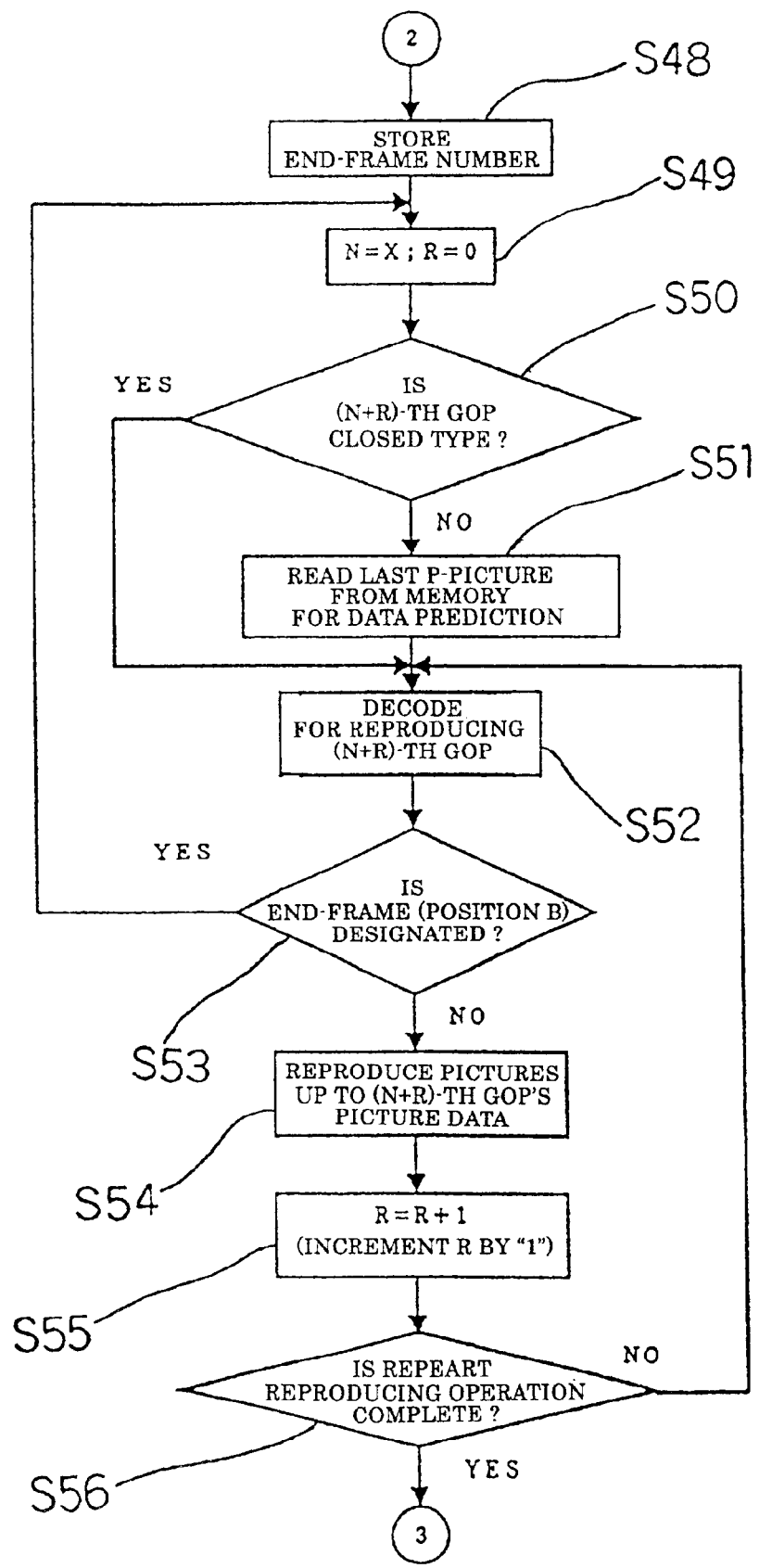
FIG. 11 illustrates a second sub-routine in the operation of the coded picture data reproducing apparatus of the second embodiment.

FIG. 11 illustrates a second sub-routine in the operation of the coded picture data reproducing apparatus of the first embodiment This main routine and the first and the second sub-routines mentioned above are connected by the nodes 1 to 3.

The programs shown by the flowcharts have been installed in the microprocessor Mp, as shown in a block diagram of FIG. 8. That is, the microprocessor Mp controls the optical pickup Pu, the MPEG decoder Mpg or the decoded B-picture data memory Dmb in the coded picture data reproducing apparatus by the command according to the determination and/or processing steps, as shown in the flowchart, so as to execute the repetitive reproduction of pictures between the start-frame and the end-frame that are designated by the key input system Kb.

In FIG. 9, S31 denotes the "START" step of this program.

Following the "START" step S31, the process goes to step S32.

In step S32, an initial value is substituted for the arguments N and R to search the MPEG encoded picture data in every GOP which is recorded on the optical disc D.

The values N and R are stored in the internal memory of the microprocessor Mp.

In step S32, the value N is set to the positive integer larger than 0, and the value R is set to −1.

Next, the process goes to step S33.

In step S33, the optical pickup Pu is driven by the optical pickup drive motor Pm in order to search and obtain the picture data belonging to the (N+R)-th GOP.

Then, the picture data is decoded per each frame of the GOP in the MPEG decoder Mpg. After that all of the decoded picture data are temporarily stored in the frame buffer Fb To start the reproduction of the picture data, the frames of the pictures are forwarded to the video D/A converter Vda on the rear in the reproducing sequence.

The video D/A converter Vda starts the conversion of the input picture data into the analog video signal, and then sequentially forwards the converted video signal to the monitor Mnt via the signal line.

The monitor Mnt starts the reproduction of the picture by the input video signal.

Since the value N is set to the positive integer larger than 0 and the value R is set to −1 in the previous step S62, the picture data belonging to the N-th GOP will be fetched first.

Next, the process goes to step S34.

In step S34, the microprocessor Mp makes processings to overwrite the B-picture data which are reproduced in preceding the I-picture in GOP on to the decoded B-picture data memory Dmb.

Next, the process goes to step S35.

In step S35, at the reproducing time of the picture data belonging to the (N+R)-th GOP it is discriminated whether or not the start-frame (position A) is designated.

The start-frame (position A), that is, the start position for repetitive reproduction is designated by pressing a start position designation key mounted through a key-input system Kb.

In case that the determination in step S35 results in "YES", i.e., when it is determined that there is a designation of the start-frame (position A), the process goes to the first sub-routine, as shown in FIG. 10, via the node 1.

However, in case that the determination in step S35 results in "NO", i.e., when it is determined that there is no designation of the start-frame (position A), the process goes to step S36.

In step S36, the argument R is incremented by 1 in order to search and obtain the picture data belonging to the next GOP.

Since the initial value R is set to the value −1 in step S32, the picture data fetched next will be belonged in the N-th GOP.

As described above, the value R is stored in the internal memory of the microprocessor Mp.

The microprocessor Mp obtains the picture data belonging to the GOP based on the argument R by the optical pickup Pu.

Next, the process goes to step S37.

In step S37, it is discriminated whether or not the reproducing operation of the coded picture data reproducing apparatus is completed.

The judgment if the reproducing operation is completed or not is determined whether or not the end key mounted through a key-input system Kb has been pressed.

If it is determined that the STOP-key has been pressed, and the result of the determination is YES, that is, the reproducing is completed, the process goes to the "END" step S38 and become complete.

However, in case that the determination results in "NO", i.e., when it is not determined that the STOP-key has been pressed, and that the reproducing is not complete, the process of step S33 is again executed.

The processings from step S33 to step S37 are repetitively executed till it is discriminated that the reproducing processing is completed in step S37, thus the picture data belonging to GOP is sequentially fetched and the fetched picture data is sequentially reproduced per each frame.

Steps from S33 to S37 form a conditional loop for consecutively reproducing the GOPs.

In this consecutive reproduction, the optical pickup Pu which is controlled by the microprocessor Mp obtains the data as tracing the data truck formed on the truck of disc D.

The picture data belonging to each GOP is sequentially recorded on the data truck. Thus, if the optical pickup Pu traces the data truck, the coded picture data reproducing apparatus obtains the picture data belonging to each GOP sequentially inevitably so as to carry out the successive reproducing.

Next, the first sub-routine of this program will be explained in reference to FIG. 10.

The first sub-routine is programmed to execute the process following the main-routine, as shown in FIG. 9, via the node 1.

The process of step S39 is carried out when the determination in step S35 results in "YES", i.e., when it is determined that there is a designation of the start-frame (position A).

In step S34, a B-picture data reproduced in preceding the I-picture data in GOP containing a picture data of designated start-frame is temporarily stored in the decoded B-picture data memory Dmp.

The picture data of the start-frame, what is a B-picture data, is contained in the picture data stored in the decoded B-picture data memory Dmp.

In step S39, the microprocessor Mp controls the decoded B-picture data memory Dmp to hold to store the decoded B-picture data containing the picture data of the start-frame.

After the processing of step S39, it goes to step S40.

In this time, the microprocessor Mp makes the number of the designated start-frame be stored in its internal memory.

The frame number is a relative information showing the position of the frame in the GOP.

In next step S41, the microprocessor Mp makes the number of the GOP containing the picture data of the start-frame be stored in its internal memory.

In the program, the number of the GOP containing the start-frame is defined as X.

Then, by substituting the value N+R for the value X, the microprocessor Mp memorizes the number of the GOP containing the start-frame in the internal memory In this time, an address that is used for searching the picture data belonging to the GOP is also stored in the internal memory by linked to the GOP number, so that the address is quotated based on the GOP number.

Following step S41, the process goes to step S42.

In step S42, it is discriminated whether or not the (N+R)-th GOP wherein the picture data of the designated start-frame is contained is a closed type.

Whether the GOP is closed type or not is determined by the value of the GOP type flag that is the control data applied to each GOP is "1" or "0", as shown in FIG. 2.

An entire picture data belonging to the closed type GOP is able to be decoded without the use of the picture data of the frame belonging to other GOP.

The picture data belonging to the non-closed type GOP is not able to be decoded unless using already decoded P-picture data corresponding to last frame that is reproduced last in the GOP reproduced just before the GOP containing the B-picture to be decoded in order to decode the B-picture corresponding to the frame reproduced in preceding the frame corresponding to the I-picture.

Here, if the result of determination of the GOP type is YES, that is, if the microprocessor Mp determines the GOP type a closed type GOP based on the GOP type flag, the process goes to step S44. If the result if NO, that is, if the GOP is not a closed type, the process goes to step S43.

In step S44, the microprocessor Mp sets the GOP type flag to "1".

In step S43, the microprocessor Mp sets the GOP type flag to "0".

When completed the processes in both steps S43 and S44, the microprocessor Mp carries out the determination process in step S45.

In step S45, it is discriminated whether or not the end-frame (position B) is designated at reproducing time of picture data belonging to the (N+R)-th GOP.

The end-frame (position B) is designated by pressing an end position designation key mounted through a key-input system Kb.

In case that the determination in step S45 results in "YES", i.e., when it is determined that there is a designation of the end-frame (position B), the process goes to the second sub-routine, as shown in FIG. 11, via the node 2.

However, in case that the determination in step S45 results in "NO", i.e., when it is determined that there is no designation of the end-frame (position B), the process goes to step S46.

In step S46, the argument R is incremented by 1 in order to search and obtain the picture data belonging to the next GOP.

In step S47 following step S46, the microprocessor Mp drives the optical pickup Pu by the optical pickup drive motor Pm so as to search and obtain the picture data belonging to the (N+R)-th GOP.

Here, since the value R has been incremented by "1", the fetched picture data belongs to another GOP that follows the GOP wherein the start-frame belongs.

Then, the picture data in the GOP is decoded in every frame by the MPEG decoder Mpg. All of the decoded frame data are temporarily stored in the frame buffer Fb.

To start the reproduction of the picture data, the frames of the pictures are forwarded to the video D/A converter Vda on the rear in the reproducing sequence.

Then, the video D/A converter Vda starts the conversion of the input picture into the analog video signal, and then it sequentially displays the converted video signal as a picture on the monitor Mnt via the signal line.

The monitor Mnt starts to display the picture based on the input video signal.

Following step S4, the process reverts to step S42.

That is, a series of the processes across steps S42 to S47 is repetitively executed and thus the picture data belonging to GOP on the data truck are sequentially reproduced, unless the end-fame is designated through the key input system Kb and the microcomputer Mp determines in step S45 that an end-frame has been designated.

Steps from S42 to S47 form a conditional loop for consecutively reproducing the GOPs.

As mentioned above, at the successive reproducing time of GOP, the optical pickup Pu which is controlled by the microprocessor Mp obtains the picture data as tracing the data truck formed on the truck of disc D.

Next, the second sub-routine of this program will be explained in reference to FIG. 11.

The second sub-routine is programmed to execute the process following the first sub-routine, as shown in FIG. 10, via the node 2. That is, the second sub-routine is a program for the repetitive reproduction to be executed when designated the end-frame (position B).

The process of step S48 is carried out when the determination in step S45 results in "YES", i.e., when it is determined that there is a designation of the end-frame (position B).

In this time, the microprocessor Mp makes the number of the designated start-frame be stored in its internal memory.

The frame number is a relative information showing the position of the frame in the GOP.

The microprocessor Mp carries out the process of step S49 after the process of step S48 has completed.

In step S49, the microprocessor Mp substitutes the value X, i.e., the number of the GOP to which the picture data of the start-frame stored in the internal memory in step S41 belongs for the argument N.

Further, the microprocessor Mp substitutes the value 0 for the argument R so as to decode the picture data sequentially from the picture data belonging to the GOP containing the start-frame.

Further, the microprocessor Mp quotates the address of GOP wherein the picture data of a start-frame is contained based on the argument N+R, and it moves the optical pickup Pu to the record position of the picture data belonging to the GOP on the disc based on the address so that the microprocessor Mp searches and obtains the picture data belonging to the GOP wherein the picture data of the start-frame belongs.

After processing in step S49, the microprocessor Mp carries out the judging processing in step S50.

In step S50, it is discriminated whether or not the GOP wherein the picture data of the start-frame belongs, that is, the (N+R)-th GOP is a closed type.

Whether the (N+R)-th GOP is closed type or not is determined by the value 1 or 0 of the GOP type flag set in the internal memory of the microprocessor Mp in step S43 or steps44.

It is discriminated that if the GOP type flag stored in the internal memory of the microprocessor Mp is "1" the GOP wherein the picture data of the start-frame belongs is a closed type, and if the GOP type flag is "0" the GOP is not a closed type.

Here, if the result of the determination of the GOP type is YES, that is, the microprocessor Mp determines the GOP as a closed type based on the GOP type flag, the process goes to step S52 The result YES means the GOP containing the picture data of a start-frame is a closed type.

The picture data corresponding to all of the frames in a closed type GOP is able to be decoded by only the picture data corresponding to the frame in the GOP.

The microprocessor Mp decodes the picture data of the (N+R)-th GOP, that is, the GOP containing the picture data of the start-frame by controlling the MPEG decoder Mpg. All of the decoded frame data are temporarily stored in the frame buffer Fb.

To start the reproduction of the picture data, the picture data of the frames temporarily stored in the frame buffer Fb are forwarded to the video D/A converter Vda on the rear in the reproducing sequence from the B-picture data corresponding to the start-frame in the GOP.

On the other hand, if the result if NO, that is, the GOP is not a closed type, the process goes to step S51.

In step S51, the microprocessor Mp controls the decoded P-picture data memory Dmp to yield the recorded P-picture data.

The B-picture data output from the decoded B-picture data memory Dmp is a B-picture data corresponding to a frame reproduced in preceding the I-picture in GOP containing the start-frame.

The B-picture data is temporarily stored in the frame buffer Fb.

Following step S51, the process goes to step S52.

In step S52, the microprocessor Mp controls the MPEG decoder Mpg to decode frame picture data that are reproduced following a frame corresponding to the I-picture data containing the start-frame data in the GOP.

These frame picture data reproduced following the frame of the I-picture data are also temporarily stored in the frame buffer Fb.

Then, the microprocessor Mp forwards the picture data which are temporarily stored in the frame buffer Fb to the video D/A converter Vda in reproducing sequence.

The control operation of the microprocessor Mp will be explained in reference to FIG. 17.

N in step S41 denotes the number X of the GOP containing a recorded start-frame.

Then, the value R at the start-frame designation time is defined "1", the start-frame is defined an position A frame in the N'th GOP, and the picture data is defined a position B data B1.

Further, a frame picture data following the B-picture data B1 is defined a picture data B2.

These B-picture data B1 and B2 are temporarily stored in a decoded B-picture data memory Dmb.

Then, the value R at the end-frame designation is set up to the positive integer equal to or larger than 1, the end-frame is defined as a position B in the (N+R)-th GOP, which picture data is defined a P-picture data Pr.

When the P-picture data Pr in the position B frame is decoded and displayed on the monitor Mnt, then the position B frame is designated as an end-frame by the key input system Kb, the microprocessor Mp quotates an address for searching the picture data belonging to the N-th GOP, which is stored in the internal memory by linked to the GOP number containing a start-frame (position A) in step S41, and it makes an optical pickup Pu move to the position where the picture data is recorded based on the address for searching the picture data belonging to the N-th GOP so as to obtain the picture data belonging to the N-th GOP.

Then the microprocessor Mp controls the decoded B-picture data memory Dmb to yield the B-picture data B1 and B2 recorded thereon so as to be temporarily stored in the frame buffer Fb.

Further, the microprocessor Mp controls the MPEG decoder Mpg to decode an entire picture data corresponding to P and B-picture data except the B-picture data B1 and B2 which reproduced in preceding the frame of the I-picture data Ip in the N-th GOP.

Further, the microprocessor Mp temporarily stores the decoded picture data that correspond to I, P and B-picture data in the N-th GOP in the frame buffers Fb.

Then, to start repetitive reproduction the picture data, the decoded picture data of each frame that are temporarily stored in the frame buffer Fb is output to the video D/A converter Vda on the rear in the reproducing sequence from the B-picture data B1 corresponding to a start-frame (position A) designated in the GOP.

Accordingly, by fetching the picture data in GOP, which contains the start-frame, the repetitive reproduction is executed from the picture corresponding to the start-frame.

After the process of step S52, the microprocessor Mp carries out the process of step S53.

In step S53, the picture data corresponding to an end-frame (position B), that is, a P-picture data Pr is fetched by the optical pickup Pu, and it is discriminated whether or not the reproducing is completed.

In case that the determination in step S53 results in "YES", i.e., when it is determined that the reproduction of the picture of the end-frame is complete, the process of step S49 is again executed.

In this time, the microprocessor Mp again makes the optical pickup Pu move to search the picture data belonging to the N-th GOP containing the start-frame.

The picture data belonging to the N-th GOP searched by the optical pickup are decoded in the MPEG decoder, and then sequentially forwarded to the video D/A converter.

Steps from S49 to S53 form a conditional loop, wherein the picture data belonging to GOP is fetched by the optical pickup Pu sequentially, and it is decoded in the MPEG decoder Mpg, then it is reproduced in the monitor Mnt so as to reproduce the picture between the start-frame and the end-frame repetitively.

However, in case that the determination in step S53 results in "NO", i.e., when it is not determined that the STOP-key has been pressed, and that the reproducing is not complete, the process goes to step S54.

In this time, the microprocessor Mp outputs the picture data till the last frame in the (N+R)-th GOP which is temporarily stored in the frame buffer Fb and have been reproduced to the video Da converter Vda successively in the reproducing sequence, so as to complete the reproduction of all of the frames in the (N+R)-th GOP.

In step S55, the microprocessor Mp counts up the argument R for searching and fetching the picture data of next GOP one by one, and stores the value R in the internal memory After the process of step S55, the microprocessor Mp carries out the process of step S56.

In step S56, it is discriminated whether or not the repetitive reproduction is complete.

Specifically, the operation for determining whether or not the repetitive reproduction STOP-key which is provided on the key-input system Kb has been pressed is executed by the microprocessor Mp.

Here, when it is determined that the repetitive reproduction is not complete, the process goes to step S52.

In this time, in step S52, since the value R has been incremented by "1", the reproduced picture data belongs to the following GOP. The reproduction of the frame belonging to the GOP is started.

That is, a series of steps S52 to S56 form a conditional loop for maintaining the repetitive reproduction condition.

The repetitive reproduction will be continued unless the microprocessor Mp determines the repetitive reproduction end-key mounted through a key-input system Kb has been pressed.

In step S56, when the microprocessor Mp determines that the repetitive reproduction is complete, the process returns to the main routine of FIG. 9 for the normal reproduction process from step S33 to step S37, via the node 3.

Here, the operation of the conventional coded picture data reproducing apparatus in case that the B-picture frame which is reproduced in preceding the I-picture in the GOP is designated as a start-frame (position A), then the end-frame (position B) is designated will be explained in reference to FIG. 7.

In FIG. 7, an position A is a start-frame, and a B-picture data reproduced in preceding the I-picture in the GOP.

Position B is an end-frame.

When the start-frame (position A) and the end-frame (position B) are designated, the optical pickup Pu searches the picture data belonging to GOP containing the start-frame (position A) so as to obtain the picture data.

In this time, B-picture data corresponding to the start-frame (position A) which have been stored beforehand and other picture data of other frame in the decoded GOP are forwarded to the video D/A converter Vda in the reproducing sequence from the start-frame.

The, the monitor Mnt displays a picture on a screen from the designated start-frame picture of position A. As illustrated by the broken-arrow line in FIG. 7, the pictures from the start-frame (position A) to the end-frame (position B) are repetitively reproduced.

Figure 12:
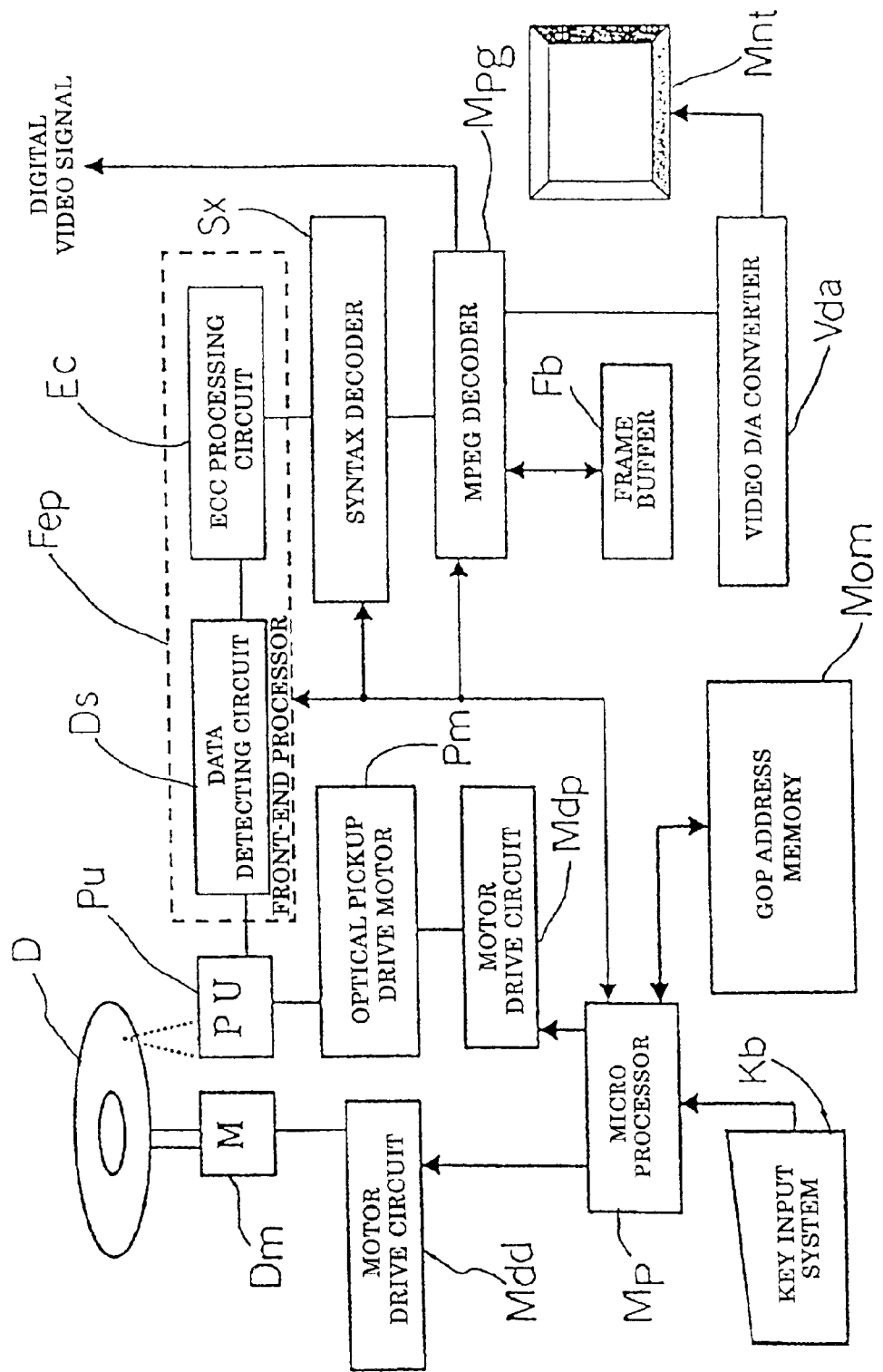
FIG. 12 is a block diagram showing a third embodiment of the coded picture data reproducing apparatus.

FIG. 12 is a block diagram showing a coded picture data reproducing apparatus of the third embodiment.

The coded picture data reproducing apparatus, as shown in FIG. 12, is comprised of a microprocessor Mp, a key input system Kb, a motor drive circuit Mdd, a disc drive motor Dm, a motor drive circuit Mdp, an optical pickup drive motor Pm, an optical pickup Pu, a syntax decoder Sx, an MPEG decoder Mpg, a frame buffer Fb, a video D/A converter Vda and a front-end processor Fep.

The front-end processor Fep is comprised of a data detecting circuit Ds and an ECC processing circuit Ec.

A turntable (not shown) for loading thereon the optical disc D is fixed to the rotor shaft of the disc drive motor Dm. The turntable is driven by the rotation of the rotor shaft and thus rotates the optical disc D loaded thereon.

The video D/A converter Vda has a video signal output terminal which is capable of mechanically and electrically connecting to a signal line.

The signal line is able to be both mechanically and electrically connected to a video input terminal of the monitor Mnt with a display device such as a liquid crystal device or a cathode-ray tube. The video D/A converter Vda forwards the video signals to the monitor Mnt via the signal line.

The monitor Mnt displays a picture image on its display screen according to the input video signal.

Further, the MPEG decoder Mpg has an output terminal which is capable of outputting a digital video signal.

The microprocessor Mp is connected to the key input system Kb, the motor drive circuit Mdd and the motor drive circuit Mdp via the signal line.

The microprocessor Mp is connected to the front-end processor Fep, the syntax decoder Sx and the MPEG decoder Mpg via the two-way bus line.

Further, the microprocessor Mp controls blocks connected to the microprocessor Mp according to the command provided through a key-input system Kb.

For instance, when the user command for directing a reproduction of the picture data recorded on the optical disc D is forwarded from the key input system Kb to the microprocessor Mp, the microprocessor Mp forwards operation signals to the motor drive circuit Mdd and the motor drive circuit Mdp for making them rotate the optical disc D.

The motor drive circuits Mdd and Mdp receive the operation signals from the microprocessor Mp and then forward driving signals to a disc drive motor Dm and an optical pickup drive motor Pm respectively coupled thereto.

The disc drive motor Dm rotates the optical disc D at the rotation speed according to the driving signal.

The optical pickup drive motor Pm moves the optical pickup Pu to the optical disc D in the radius direction according to the driving signal so that the optical pickup Pu search the picture data to be reproduced.

The optical pickup Pu irradiates a laser beam to the signal recording surface of the optical disc D so as to obtain the record signal based on the reflection light.

The disc is recorded thereon picture data and addresses for indicating the record positions of the picture data. And the optical pickup Pu is moved according to the address to search the picture data to be reproduced.

The optical pickup Pu searches the picture data to be reproduced, then it obtains the record signal corresponding to the picture data on the disc.

The record signal picked up by the optical pickup Pu is forwarded to the data extracting circuit Ds which is contained in the front-end processor Fep, which is located in rear of the optical pickup Pu.

The record signal is a wave-formed signal called a RF signal. The data extracting circuit Ds slices the RF signal at a specific timing so as to generate a rectangular wave-formed data signal.

Further, the data extracting circuit Ds forwards the data signal to the ECC processing circuit Ec on the rear.

The data signal is record by executed a NRZI (Non Return to Zero Inverted) modulation at recording time.

The ECC processing circuit Ec extracts a data signal from the invert interval of the data signal according to the NRZI demodulation rule, and performs the error correction of the data in each ECC block, and then forwards the data signal to the syntax decoder Sx located in rear of the circuit Ec.

The syntax decoder Sx extracts the control data from the input data signal according to the command that is output from the microprocessor Mp. Further the syntax decoder Sx extracts the picture data and then forwards the picture data to the MPEG decoder Mpg located in rear of the decoder Sx.

The picture data is coded in the MPEG (Moving Picture Expart Group) system. The picture data is decoded in the MPEG decoder Mpg by the command output from the microprocessor Mp according to the decoding algorithm of pre-determined MPEG system.

A frame buffer Fb, which is connected to the MPEG decoder Mpg via the two-way bus line works as a work memory for temporarily storing the picture data when the MPEG coded picture data is decoded.

The picture data temporarily stored in the frame buffer Fb is added a synchronizing data for every frame, then it is forwarded to the video D/A converter Vda located in rear of the MPEG decoder Mpg.

Or the MPEG decoder Mpg could output the picture data from the digital video signal output terminal as the digital video signal.

The video D/A converter Vda converts the input picture data into the analog video signal.

Then, the video D/A converter Vda forwards the video signal which is converted to the analog signal to the monitor Mnt located in rear of the converter Vda, via the signal line.

The monitor Mnt displays the picture image on a display device such as a liquid crystal device or a cathode-ray tube according to the input video signal.

In the coded picture data reproducing apparatus according to the present invention, the picture image is reproduced in the way as mentioned above.

In the coded picture data reproducing apparatus of this embodiment, a GOP address memory Mom is newly mounted on the configuration mentioned above In this GOP address memory Mom, when the start-frame (position A) is designated by the key input system Kb an address data for searching the picture data belonging to GOP that is reproduced just before the GOP wherein the picture data corresponding to the start-frame (position A) belongs is stored for repeat reproduce.

Next, the operation of the coded picture data reproducing apparatus of the third embodiment, as shown in FIG. 12, will be explained in reference to FIGS. 13 to 15.

Figure 13:
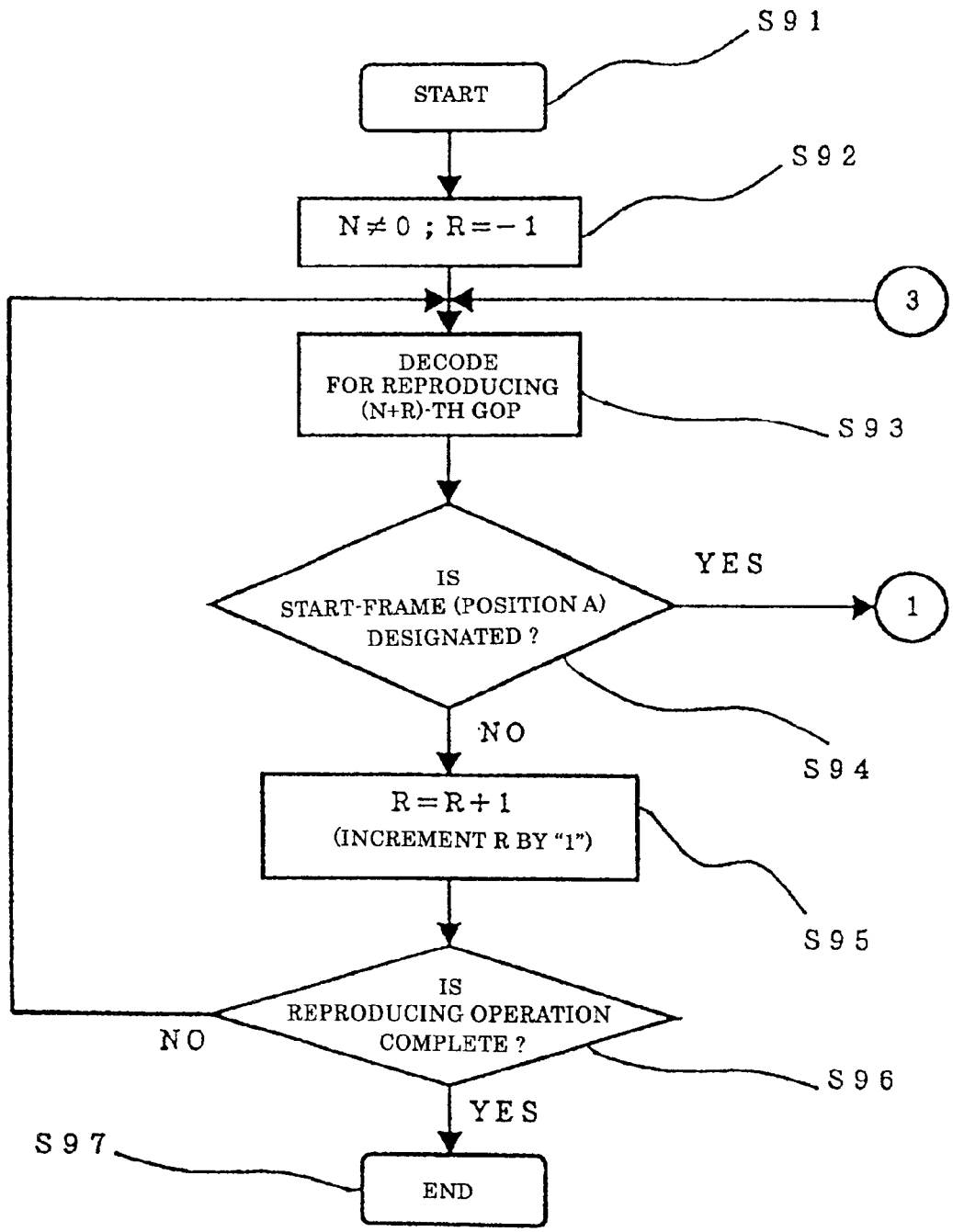
FIG. 13 illustrates a main-routine in the operation of the coded picture data reproducing apparatus of the third embodiment.

FIG. 13 illustrates a main routine in the operation of the coded picture data reproducing apparatus of the third embodiment.

Figure 14:
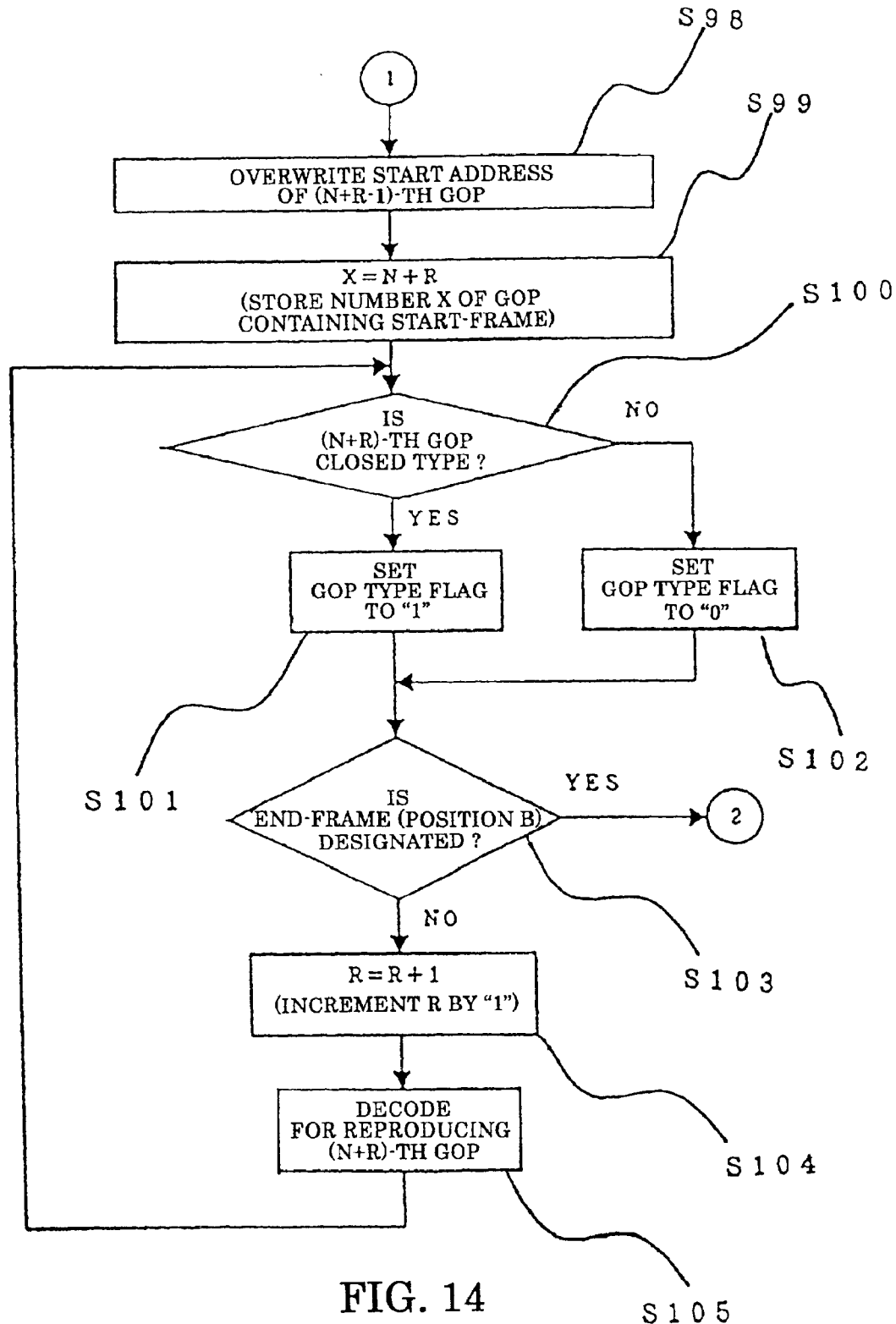
FIG. 14 illustrates a first sub-routine in the operation of the coded picture data reproducing apparatus of the third embodiment.

FIG. 14 illustrates a first sub-routine in the operation of the coded picture data reproducing apparatus of the third embodiment.

Figure 15:
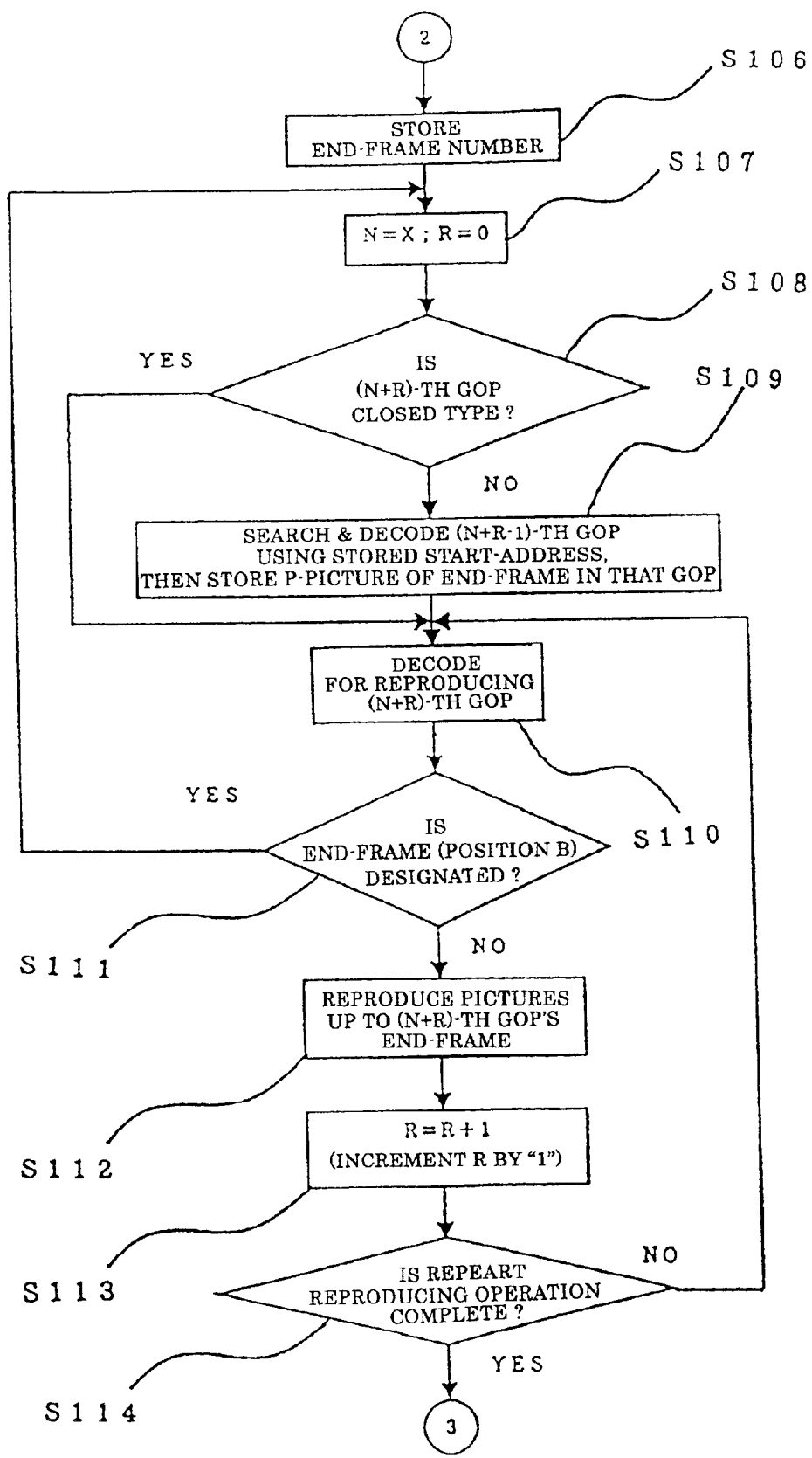
FIG. 15 illustrates a second sub-routine in the operation of the coded picture data reproducing apparatus of the third embodiment.
Figure 16:
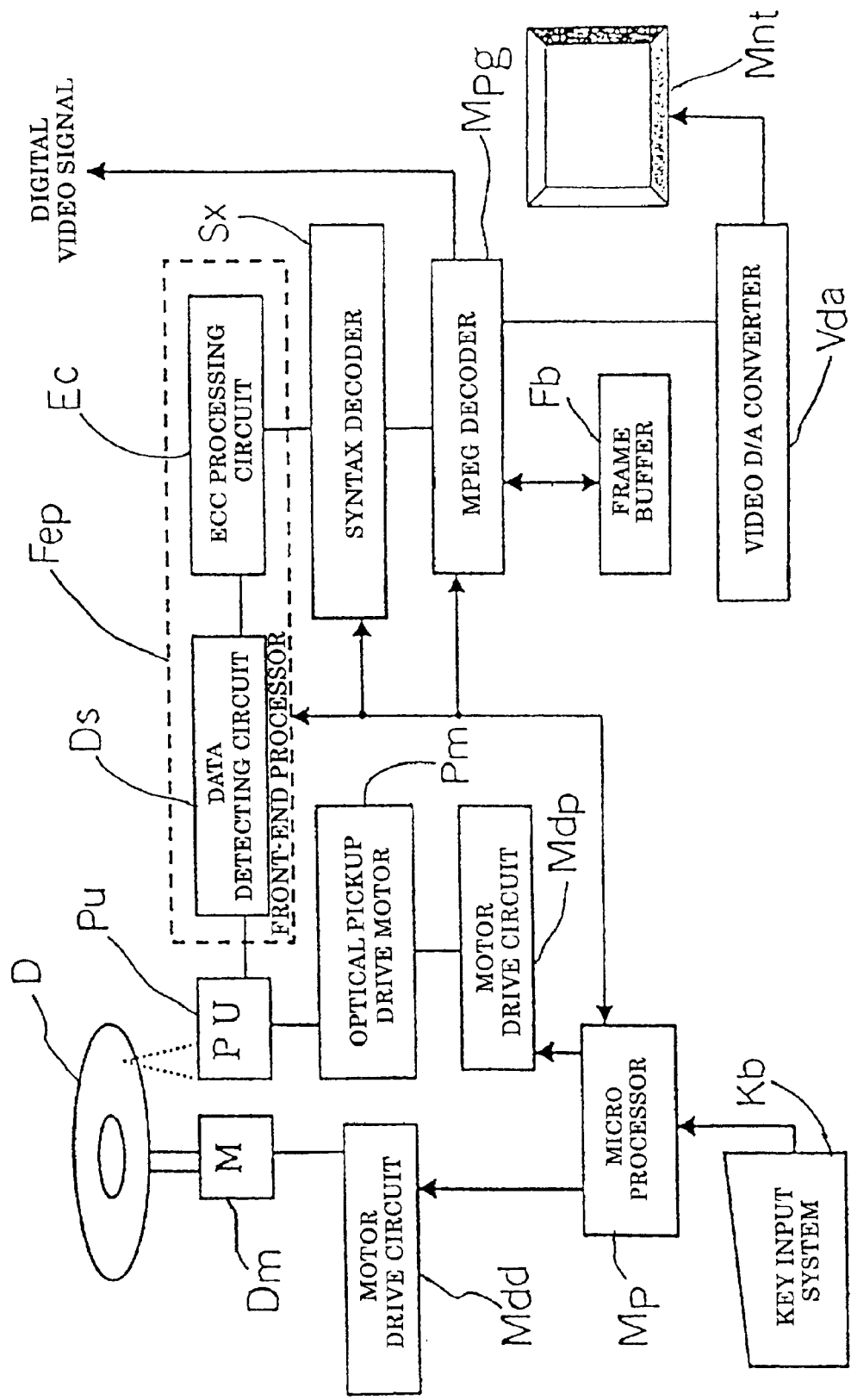
FIG. 16 is a block diagram showing a conventional coded picture data reproducing apparatus.

FIG. 15 illustrates a second sub-routine in the operation of the coded picture data reproducing apparatus of the third embodiment These main routines and the first and the second sub-routines mentioned above are connected by the nodes 1 to 3.

The programs shown by the flowcharts have been installed in the microprocessor Mp, as shown in a block diagram of FIG. 12. That is, the microprocessor Mp controls the optical pickup Pu, the MPEG decoder Mpg or the GOP address memory Mom in coded picture data reproducing apparatus by the command according to the judgment or steps of processing, as shown in the flowchart, so as to execute the repetitive reproduction of pictures between the start-frame and the end-frame are designated by the key input system Kb.

In FIG. 13, S91 denotes the "START" step of this program.

Following the "START" step S91, the process goes to step S92.

In step S92, an initial value is substituted for the arguments N and R to search the MPEG encoded picture data in every GOP which is recorded on the optical disc D.

The values N and R are stored in the internal memory of the microprocessor Mp.

In step S92, the value N is set to the positive integer larger than 0, and the value R is set to −1.

Next, the process goes to step S93.

In step S93, the optical pickup Pu is driven by the optical pickup drive motor Pm in order to search and obtain the picture data belonging to the (N+R)-th GOP.

Then, the picture data is decoded per each frame of the GOP in the MPEG decoder Mpg. After that all of the decoded picture data are temporarily stored in the frame buffer Fb.

To start the reproduction of the picture data, the picture data of the frames of the pictures are forwarded to the video D/A converter Vda on the rear in the reproducing sequence.

The video D/A converter Vda starts the conversion of the input picture data into the analog video signal, and then sequentially forwards the converted video signal to the monitor Mnt via the signal line.

The monitor Mnt starts the reproduction of the picture by the input video signal.

Since the value N is set to the positive integer larger than 0 and the value R is set to −1 in the previous step S92, the picture data belonging to the N-th GOP will be fetched first.

Next, the process goes to step S94.

In step S94, at the reproducing time of the picture data belonging to the (N+R)-th GOP it is discriminated whether or not the start-frame (position A) is designated.

The start-frame (position A), that is, the start position for repetitive reproduction is designated by pressing a start position designation key mounted through a key-input system Kb.

In case that the determination in step S94 results in "YES", i.e., when it is determined that there is a designation of the start-frame (position A), the process goes to the first sub-routine, as shown in FIG. 14, via the node 1.

However, in case that the determination in step S94 results in "NO", i.e., when it is determined that there is no designation of the start-frame (position A), the process goes to step S95.

In step S95, the argument R is incremented by 1 in order to search and obtain the picture data belonging to the next GOP.

Since the initial value R is set to the value −1 in step S95, the picture data fetched next will be belonged in the N-th GOP.

As described above, the value R is stored in the internal memory of the microprocessor Mp.

The microprocessor Mp obtains the picture data belonging to the GOP based on the argument R by the optical pickup Pu.

Next, the process goes to step S96.

In step S96, it is discriminated whether or not the reproducing operation of the coded picture data reproducing apparatus is completed.

The judgment if the reproducing operation is completed or not is determined whether or not the end key mounted through a key-input system Kb has been pressed.

If it is determined that the STOP-key has been pressed, and the result of the determination is YES, that is, the reproducing is completed, the process goes to the "END" step S97 and become complete.

However, in case that the determination results in "NO", i.e., when it is not determined that the STOP-key has been pressed, and that the reproducing is not complete, the process of step S93 is again executed.

The processings from step S93 to step S96 are repetitively executed till it is discriminated that the reproducing processing is completed in step S96, thus the picture data belonging to GOP is sequentially fetched and the fetched picture data is sequentially reproduced per each frame.

Steps from S93 to S96 form a conditional loop for consecutively reproducing the GOPs.

In this consecutive reproduction, the optical pickup Pu which is controlled by the microprocessor Mp obtains the data as tracing the data truck formed on the truck of disc D.

The picture data belonging to each GOP is sequentially recorded on the data truck. Thus, if the optical pickup Pu traces the data truck, the coded picture data reproducing apparatus sequentially obtains inevitably a sequence of the picture data belonging to the GOPs and carries out the successive reproducing.

Next, the first sub-routine of this program will be explained in reference to FIG. 14.

The first sub-routine is programmed to execute the process following the main-routine, as shown in FIG. 13, via the node 1.

The process of step S98 is carried out when the determination in step S94 results in "YES", i.e., when it is determined that there is a designation of the start-frame (position A).

In step S98, the microprocessor Mp outputs a command for storing an address data in the GOP address memory Mom for searching the picture data which belong in GOP reproduced just before the GOP to which the picture data corresponding to the start-frame (position A) designated by the key input system Kb belongs.

The picture data of the start-frame (position A) belongs in the (N+R)-th GOP. That is the GOP which is reproduced just before the GOP wherein the start-frame (position A) belongs is the (N+R−1)-th GOP.

That means, the GOP address memory Mom stores an address for searching the picture data belonging to the (N+R−1)-th GOP.

According to command from the microprocessor Mp, the GOP address memory Mom updates an address and overwrite a new address over for searching picture data belonging to the N+R−1 GOP whenever the start-frame (position A) is designated by the key input system Kb.

The address will be explained hereinafter.

In FIG. 12, a disc D, wherein picture data that are reproduced by the coded picture data reproducing apparatus are recorded, is produced based on the DVD standard.

As explained in FIGS. 2 and 3, the basic recording unit of the DVD standard disc is VOBU, which comprised of a navigation pack Nvp containing a control data and picture data for 1 or 2 GOPs.

Further, the navigation pack Nvp contains DSI for accessing other VOBU. The DSI further contains VOBU search information VOBU_SRI.

As shown in FIG. 3, the VOBU search information VOBU_SRI is comprised of start address data showing the positions where other VOBUs are recorded which are reproduced before and after the standard VOBU containing the VOBU search information.

That is the VOBU_SRI contains a start-address of precedingly reproduced VOBU.

Further, as mentioned above, the VOBU contains picture date for 1 or 2 GOPs.

In the great majority of manufactured discs, the VOBU contains only one GOP, wherein the VOBU and the GOP contained therein are related with each other in one-to-one relationship according to the MPEG standard.

That is, it will be easy to search picture data belonging to a designated GOP by using the address defined in the VOBU search information VOBU_SRI.

Accordingly, it will be easy to search picture data belonging to GOP which reproduced just before the designated GOP by using the VOBU search information VOBU_SRI.

Even when the VOBU contains two GOPs, the picture data belonging to GOP which is reproduced just before the designated GOP will be designated by searching the picture data belonging to GOP which is reproduced second in the VOBU.

In a data table of the VOBU search information VOBU_SRI, as shown in FIG. 3, a start address of the VOBU which is reproduced just before the VOBU that has been reproduced is a BWDA1 (−1 VOBU start address).

Thus, the BWDA1 is overwritten as an address data for searching GOP which is reproduced just before the GOP containing picture data corresponding to a start-frame in the GOP address memory Mom.

That is, by accessing the GOP address memory Mom to obtain an address data BWDA1 it is able to access to the video object unit (VOBU) containing the (N+R−1)-th GOP which is reproduced just before the GOP containing a picture data corresponding to a start-frame, so as to obtain a picture data belonging to the (N+R−1)-th GOP.

In step S98, processing to overwrite an address data BWDA1 for searching the (N+R−1)-th GOP to the GOP address memory Mom is carried out after the start-frame (position A) is designated, that is, when the result of the determination is YES in step S94. However, this processing may be carried out before the start-frame (position A) is designated, that is, before the process of step S94.

That is, only the address data BWDA1 for searching the (N+R−1)-th GOP needs to be always overwritten on the GOP address memory Mom data at a decoding of the picture data belonging to the GOP after the process of step S93, and also only a processing of holding the address data BWDA1 stored in the GOP address memory Mom needs to be made after designating the start-frame (position A), i.e., in the case of the determination in step S94 having resulted in "YES").

If theses porcessings mentioned above is carried out before the process of step S99, it is able to memorize an address data for searching the (N+R−1)-th GOP.

After the processing of step S98, it goes to step S99.

The microprocessor Mp makes the number of the GOP containing the picture data of the start-frame be stored in its internal memory.

In the program, the number of the GOP containing the start-frame is defined as X.

Then, by substituting the value N+R for the value X, the microprocessor Mp memorizes the number of the GOP containing the start-frame in the internal memory.

The microprocessor Mp searches a picture data of the designated start-frame based on the GOP number and the start-frame number which are stored in the internal memory.

In this time, the microprocessor Mp also makes the number of the GOP containing the picture data of the start-frame be stored in its internal memory.

In this time, an address that is used for searching the picture data belonging to the GOP is also stored in the internal memory by linked to the GOP number, so that the address is quotated based on the GOP number.

The frame number is a relative information showing the position of the frame in the GOP.

Following step S99, the process goes to step S100.

In step S100, it is discriminated whether or not the (N+R)-th GOP wherein the picture data of the designated start-frame is contained is a closed type.

Whether the GOP is closed type or not is determined by the value of the GOP type flag that is the control data applied to each GOP is "1" or "0", as shown in FIG. 2.

An entire picture data belonging to the closed type GOP is able to be decoded without the use of the picture data of the frame belonging to other GOP.

The picture data belonging to the non-closed type GOP is not able to be decoded unless using already decoded P-picture data corresponding to last frame that is reproduced last in the GOP reproduced just before the GOP containing the B-picture to be decoded in order to decode the B-picture corresponding to the frame reproduced in preceding the frame corresponding to the I-picture.

Here, if the result of determination of the GOP type is YES, that is, if the microprocessor Mp determines the GOP type a closed type GOP based on the GOP type flag, the process goes to step S101. If the result if NO, that is, if the GOP is not a closed type, the process goes to step S102.

In step S101, the microprocessor Mp sets the GOP type flag in its internal memory to "1".

In step S102, the microprocessor Mp sets the GOP type flag in its internal memory to "0".

When completed the processes in both steps S101 and S102, the microprocessor Mp carries out the determination process in step S103.

In step S103, it is discriminated whether or not the end-frame (position B) is designated at reproducing time of picture data belonging to the (N+R)-th GOP.

The end-frame (position B) is designated by pressing an end position designation key mounted through a key-input system Kb.

In this step S103, if the result of determination is YES, that is, if the end-frame (position B) is designated, the process goes to the second sub-routine, as shown in FIG. 15, via the node 2.

However, in case that the determination in step S103 results in "NO", i.e., when it is determined that there is no designation of the end-frame (position B), the process goes to step S104.

In step S104, the argument R is incremented by 1 in order to search and obtain the picture data belonging to the next GOP.

In step S105 following step S104, the microprocessor Mp drives the optical pickup Pu by the optical pickup drive motor Pm so as to search and obtain the picture data belonging to the (N+R)-th GOP.

Here, since the value R has been incremented by "1", the fetched picture data belongs to another GOP that follows the GOP wherein the start-frame belongs.

Then, the picture data in the GOP is decoded in every frame by the MPEG decoder Mpg. All of the decoded frame data are temporarily stored in the frame buffer Fb.

To start the reproduction of the picture data, the frames of the pictures are forwarded to the video D/A converter Vda on the rear in the reproducing sequence.

Then, the video D/A converter Vda starts the conversion of the input picture into the analog video signal, and then it sequentially displays the converted video signal as a picture on the monitor Mnt via the signal line.

Accordingly, the monitor Mnt starts the reproduction of the picture based on the input video signal.

Following step S105, the process reverts to step S100.

That is, a series of the processes across steps S100 to S105 is repetitively executed and thus the picture data belonging to GOP on the data truck are sequentially reproduced, unless the end-fame is designated through the key input system Kb and the microcomputer Mp determines in step S103 that an end-frame has been designated.

Steps from S100 to S105 form a conditional loop for consecutively reproducing the GOPs.

As mentioned above, at the successive reproducing time of GOP, the optical pickup Pu which is controlled by the microprocessor Mp obtains the picture data as tracing the data truck formed on the truck of disc D.

Next, the second sub-routine of this program will be explained in reference to FIG. 15.

The second sub-routine is programmed to execute the process following the first sub-routine, as shown in FIG. 14, via the node 2. That is, the second sub-routine is a program for the repetitive reproduction to be executed when designated the end-frame (position B).

The process of step S106 is carried out when the determination in step S103 results in "YES", i.e., when it is determined that there is a designation of the end-frame (position B).

In this time, the microprocessor Mp makes the number of the designated end-frame be stored in its internal memory.

The frame number is a relative information showing the position of the frame in the GOP.

The microprocessor Mp carries out the process of step S107 after the process of step S106 has completed.

In step S107, the microprocessor Mp substitutes the value X, i.e., the number of the GOP to which the picture data of the start-frame stored in the internal memory in step S99 belongs for the argument N.

Further, the microprocessor Mp substitutes the value 0 for the argument R so as to decode the picture data sequentially from the picture data belonging to the GOP containing the start-frame.

After processing in step S107, the microprocessor Mp carries out the judging processing in step S108.

In step S108, it is discriminated whether or not the GOP wherein the picture data of the start-frame belongs, that is, the (N+R)-th GOP is a closed type.

Whether the (N+R)-th GOP is closed type or not is determined by the value 1 or 0 of the GOP type flag set in the internal memory of the microprocessor Mp in step S101 or steps 102.

It is discriminated that if the GOP type flag stored in the internal memory of the microprocessor Mp is "1" the GOP wherein the picture data of the start-frame belongs is a closed type, and if the GOP type flag is "0" the GOP is not a closed type.

Here, if the result of the determination of the GOP type is YES, that is, the microprocessor Mp determines the GOP as a closed type based on the GOP type flag, the process goes to step S110.

The result YES means the GOP containing the picture data of a start-frame is a closed type.

The picture data corresponding to all of the frames in a closed type GOP is able to be decoded by only the picture data corresponding to the frame in the GOP.

In this time, the microprocessor Mp searches a picture data of the (N+R)-th GOP by quotating an address for searching the GOP to which the start-frame belongs based on the number of the GOP stored in the internal memory in step S99.

The microprocessor Mp decodes the picture data of the (N+R)-th GOP, that is, it decodes picture data corresponding to all of the frames of GOP containing the picture data of the start-frame by using only the picture data belonging to the (N+R)-th GOP, by controlling the MPEG decoder Mpg. All of the decoded frame data are temporarily stored in the frame buffer Fb.

To start the reproduction of the picture data, the decoded picture data corresponding to the frames temporarily stored in the frame buffer Fb are forwarded to the video D/A converter Vda on the rear in the reproducing sequence from the B-picture data corresponding to the start-frame in the GOP.

On the other hand, if the result is NO, that is, if the GOP is not a closed type, the process goes to step S109.

In step S109, the microprocessor Mp makes the recorded address data BWDA1 be output from the GOP address memory Mom.

The address data BWDA1 output from the GOP address memory Mom indicates a start address of the video object unit (VOBU) containing a GOP which is reproduced just before the GOP containing the start-frame, as shown in FIG. 3.

The microprocessor Mp searches a picture data belonging to the (N+R−1)-th GOP which is reproduced just before the (N+R)-th GOP by the optical pickup Pu based on the address data BWDA1 so as to obtain the picture data belonging to the (N+R−1)-th GOP.

Further, the microprocessor Mp controls the MPEG decoder Mpg to decode the picture data belonging to the (N+R−1)-th GOP by its command.

Then, the microprocessor Mp stores the P-picture data corresponding to a frame reproduced last in the (N+R−1)-th GOP among the decoded picture data in the frame buffer Fb.

Following the process of step S109, the process goes to step S110.

In step S110, the microprocessor Mp decodes a picture data belonging to the (N+R)-th GOP, that is, it decodes a picture data belonging to a GOP containing a start-frame by using the P-picture data that is stored in the frame buffer in step S109.

Specifically, the microprocessor Mp decodes B-picture data corresponding to a frame which is reproduced in preceding the frame of the I-picture data belonging to the (N+R)-th GOP, between the frame of the I-picture data and a frame of P-picture data belonging to the (N+R−1)-th GOP, by using the decoded P-picture data and the I-picture data.

Further, the MPEG decoder Mpg decodes picture data of other frames in GOP which are reproduced following the I-picture data and stores the decoded picture data to the frame buffer Fb.

The, the microprocessor Mp makes the picture data stored in the frame buffer Fb be forwarded to the video D/A converter Vda from the picture data of the start-frame in reproducing sequence.

The control operation of the microprocessor Mp will be explained hereinafter in detail in reference to FIG. 17.

N in step S99 denotes the number X of the GOP containing a recorded start-frame.

Then, the value R at the start-frame designation time is defined "0", the start-frame is defined an position A frame in the N'th GOP, and the picture data is defined a position B data B1.

Further, a frame picture data following the B-picture data B1 is defined a picture data B2.

The B-picture data B1 and B2 are temporarily stored in the decoded B-picture data memory Dmb.

Then, the value R at the end-frame designation is set up to the positive integer equal to or larger than 1, the end-frame is defined as a position B in the (N+R)-th GOP, which picture data is defined a P-picture data Pr.

When the P-picture data Pr in the position B frame is decoded and displayed on the monitor Mnt, then the position B frame is designated as an end-frame by the key input system Kb, the microprocessor Mp obtains an address data BWDA1 from the GOP address memory Mom for searching the picture data belonging to the (N−1)-th GOP, which reproduced just before the N-th GOP, and it moves an optical pickup Pu to obtain the picture data belonging to the (N−1)-th GOP.

The, the it decodes the picture data of the (N−1)-th GOP in the MPEG decoder Mpg, and it temporarily stores the P-picture data Pp corresponding to a frame which will be reproduced last in the (N−1)-th GOP in reproducing sequence to the frame buffer Fb.

Furthermore, the microprocessor Mp controls the optical pickup Pu to obtain the picture data belonging to the N-th GOP and also controls the MPEG decoder Mpg to decode the B-picture data B1 and B2 among the fetched picture data by using the I-picture data Ip and the P-picture data Pp. These B-picture data B1 and B2 correspond frames reproduced between a frame the I-picture data Ip and a frame of P-picture data Pp, and which are reproduced in preceding the I-picture data frame.

Furthermore, the microprocessor Mp controls the MPEG decoder Mpg to decode an entire picture data corresponding to P or B-picture data in the N-th GOP except the B-picture data B1 and B2 which are reproduced in preceding the frame of the I-picture data Ip.

Further, the microprocessor Mp temporarily stores the decoded picture data, which correspond to I, P, and B-picture data in the N-th GOP in the frame buffers Fb.

Then, to start the repetitive reproduction of the picture data, the decoded picture data of the frames that are temporarily stored in the frame buffer Fb are forwarded to the video D/A converter Vda on the rear in the reproducing sequence from the B-picture data B1 corresponding to the start-frame (position A) designated in the GOP Accordingly, by fetching the picture data in GOP, which contains the start-frame, the repetitive reproduction is executed from the picture corresponding to the start-frame.

Following the process of step S110, the microprocessor Mp carries out the process of step S111.

In step S111, the picture data corresponding to an end-frame (position B), that is, a P-picture data Pr belonging to the (N+R)-th GOP is fetched by the optical pickup Pu, and it is discriminated whether or not the reproducing is completed.

In case that the determination in step S111 results in "YES", i.e., when it is determined that the reproduction of the picture of the end-frame is complete, the process of step S107 is again executed.

In this time, the microprocessor Mp again makes the optical pickup Pu move to search the picture data belonging to the N-th GOP containing the start-frame.

The picture data belonging to the N-th GOP searched by the optical pickup are decoded in the MPEG decoder, and then sequentially forwarded to the video D/A converter Vda.

Steps from S107 to S111 form a conditional loop, wherein the picture data belonging to GOP is fetched by the optical pickup Pu sequentially, and it is decoded in the MPEG decoder Mpg, then it is reproduced in the monitor Mnt so as to reproduce the picture between the start-frame and the end-frame repetitively.

However, in case that the determination in step S111 results in "NO", i.e., when it is not determined that the STOP-key has been pressed, and that the reproducing is not complete, the process goes to step S112.

In this time, the microprocessor Mp outputs the picture data till the last frame in the (N+R)-th GOP which is temporarily stored in the frame buffer Fb and have been reproduced to the video Da converter Vda successively in the reproducing sequence, so as to complete the reproduction of all of the frames in the (N+R)-th GOP.

Following step S112, the process goes to step S113.

In step S113, the microprocessor Mp counts up the argument R for fetching the picture data of GOP, and stores the value R in the internal memory.

Following the process of step S113, the microprocessor Mp carries out the process of step S114.

In step S114, it is discriminated whether or not the repetitive reproduction is complete.

Specifically, the operation for determining whether or not the repetitive reproduction STOP-key which is provided on the key-input system Kb has been pressed is executed by the microprocessor Mp.

Here, when it is determined that the repetitive reproduction is not complete, the process goes to step S110.

In this time, in step S113, since the value R has been incremented by "1", the reproduced picture data belongs to the following GOP. The reproduction of the frame belonging to the GOP is started.

That is, a series of steps S110 to S114 form a conditional loop for maintaining the repetitive reproduction condition.

The repetitive reproduction will be continued unless the microprocessor Mp determines the repetitive reproduction end-key mounted through a key-input system Kb has been pressed.

In step S114, when the microprocessor Mp determines that the repetitive reproduction is complete, the process returns to the main routine of FIG. 13 for the normal reproduction procee from step S93 to step S96, via the node 3.

Here, the operation of the coded picture data reproducing apparatus of third embodiment in case that the B-picture frame which is reproduced in preceding the I-picture in the GOP is designated as a start-frame (position A), then the end-frame (position B) is designated will be explained in reference to FIG. 7.

In FIG. 7, an position A is a start-frame, and a B-picture data reproduced in preceding the I-picture in the GOP.

Position B is an end-frame.

When the start-frame (position A) and the end-frame (position B) are designated, the optical pickup Pu searches the picture data belonging to GOP containing the start-frame (position A) so as to obtain the picture data.

Further, the coded picture data reproducing apparatus decodes B-picture data corresponding to the frame to be reproduced in preceding the frame corresponding to the I-picture data, which is reproduced between a frame corresponding to the P-picture data and a frame corresponding to the I-picture data of the GOP which includes the start-frame, by using the P-picture corresponding to a frame which will be reproduced at last in the GOP among the decoded picture data. Furthermore picture data corresponding to other frames in the GOP which includes the start-frame are decoded. Then those picture data are input into the video D/A converter Vda in their reproduction sequence starting at the start-frame.

The, the monitor Mnt displays a picture on a screen from the designated start-frame picture of position A. The pictures from the start-frame (position A) to the end-frame (position B) are repetitively reproduced As explained above, in the coded picture data reproducing apparatus according to the present invention, it is able to reproduce the picture data from a designated start-frame repetitively.

According to the present invention, it is able to provide a coded picture data reproducing apparatus, which is able to reproduce the picture data repetitively from a designated start-frame at repetitively reproducing.

As described above, the present invention can provide an extremely preferable coded picture data reproducing apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A coded picture data reproducing apparatus for reproducing a coded picture data which is coded from a picture signal comprised of several frames corresponding to pictures to be reproduced in the specific reproducing sequence based on the predictive coding system, and which is comprised of several groups of data which consists of an intraframe coded picture data, an interframe forward predictive coded picture data and bi-directional predictive coded picture data, comprising:

a data fetcher for fetching the coded picture data;

a decoder for decoding the picture data corresponding to each frame of the coded picture data;

a memory for storing an interframe forward predictive coded picture data corresponding to the frame which will be reproduced last within the picture data group among the decoded picture data decoded by the decoder;

a start-frame designator for designating a start-frame among the frames mentioned above;

an end-frame designator for designating an end-frame among the frames mentioned above;

a memory controller for controlling the memory to store the interframe forward predictive coded picture data corresponding to the frame which will be reproduced last of the picture data group that is reproduced just before the picture data group where the picture data corresponding to the start-frame belongs when the start-frame is designated by the start-frame designator;

a data fetcher controller for controlling the data fetcher to fetch the picture data of the picture data group where the picture data corresponding to the start-frame belongs when the end-frame is designated by the end-frame designator;

a memory controller for controlling the memory to yield the interframe forward predictive coded picture data; and a decoder controller for controlling the decoder to decode the bi-directional predictive coded picture data corresponding to the frame which is reproduced between the frame corresponding to the interframe forward predictive coded picture data output from the memory and the frame corresponding to the intraframe coded picture data in the picture data group where the start-frame belongs by using the interframe forward predictive coded picture data and the intraframe coded picture data, further controlling to decode the picture data corresponding to the frames up to the end-frame, and wherein, the pictures corresponding to the respective frames from the start-frame to the end-frame are repetitively reproduced.

2. A coded picture data reproducing apparatus as claimed in claim 1, wherein the picture data group contains a control data which shows whether the entire picture data in the picture data group could be decoded without the interframe forward predictive coded picture data of other picture data group or not; and the coded picture data reproducing apparatus comprises a judging means for judging if it uses the interframe forward predictive coded picture data or not when decoding the picture data of the picture data group based on the control data.

3. A coded picture data reproducing apparatus as claimed in claim 1, wherein a converter for converting the decoded picture data into the analog video signal; and a video signal output terminal for outputting the video signal, which is able to be coupled to the picture display device.

4. A coded picture data reproducing apparatus as claimed in claim 1, further comprising an output terminal for outputting the decoded picture data as a digital video signal.

5. A coded picture data reproducing apparatus for reproducing a coded picture data which is coded from a picture signal comprised of several frames corresponding to pictures to be reproduced in the specific reproducing sequence based on the predictive coding system, and which is comprised of several groups of data which consists of an intraframe coded picture data, an interframe forward predictive coded picture data and bidirectional predictive coded picture data, comprising:

a data fetcher for fetching the coded picture data;

a decoder for decoding the picture data corresponding to each frame of the coded picture data;

a memory for storing the bi-directional predictive coded picture data corresponding to a frame which is reproduced in preceding a frame of the intraframe coded picture data in the group of picture among the picture data decoded in the decoder;

a start-frame designator for designating a start-frame among the aforesaid frames;

an end-frame designator for designating an end-frame among the aforesaid frames;

a memory controller for controlling the memory to store the bi-directional predictive coded picture data corresponding to a frame reproduced in preceding a frame of the intraframe coded picture data in a picture data group wherein a picture data of a start-frame belongs when the start-frame is designated by the start-frame designator;

a data fetcher controller for controlling the data fetcher to fetch the picture data of the picture data group where the picture data corresponding to the start-frame belongs when the end-frame is designated by the end-frame designator;

a memory controller for controlling the memory to yield the bi-directional predictive coded picture data; and a decoder controller for controlling the decoder to decode picture data following the bi-directional predictive coded picture output from the memory up to the end-frame, and wherein, the pictures corresponding to the respective frames from the start-frame to the end-frame are repetitively reproduced.

6. A coded picture data reproducing apparatus as claimed in claim 5, further comprising:

a converter for converting the decoded picture data into the analog video signal; and a video signal output terminal for outputting the video signal, which is able to be coupled to the picture display device.

7. A coded picture data reproducing apparatus as claimed in claim 5, further comprising:

an output terminal for outputting the decoded picture data as a digital video signal.

8. A coded picture data reproducing apparatus for reproducing a coded picture data which is coded from a picture signal comprised of several frames corresponding to pictures to be reproduced in the specific reproducing sequence based on the predictive coding system, and which is comprised of several groups of data which consists of an intraframe coded picture data, an interframe forward predictive coded picture data and bi-directional predictive coded picture data, comprising:

a data fetcher for fetching the coded picture data;

a decoder for decoding the picture data corresponding to each frame of the coded picture data;

a data group address memory for storing the address data so as to search for the picture data group;

a start-frame designator for designating a start-frame among the aforesaid frames;

an end-frame designator for designating an end-frame among the aforesaid frames;

a memory controller for controlling the data group address memory to memorize address data for searching picture data of the picture data group which is reproduced just before the picture data group wherein the picture data of the start-frame belongs when the start-frame is designated by the start-frame designator;

a data fetcher controller for controlling the data fetcher to obtain picture data of a picture data group which is reproduced just before the picture data group wherein picture data of a start-frame belong based on the address data stored in the data group address memory when the end-frame is designated by the end-frame designator; and a decoder controller for controlling the decoder to decode the bi-directional predictive coded picture data corresponding to the frame which is reproduced between the frame corresponding to the interframe forward predictive coded picture data output from the memory and the frame corresponding to the intraframe coded picture data in the picture data group where the start-frame belongs by using the interframe forward predictive coded picture data and the intraframe coded picture data, further controlling the decoder to decode the picture data up to the end-frame, and wherein, the pictures corresponding to the respective frames from the start-frame to the end-frame are repetitively reproduced.

9. A coded picture data reproducing apparatus as claimed in claim 8, further comprising:

a picture data generator for generating the picture data corresponding to the start-frame and the end-frame and the picture data corresponding to the frame of the picture reproduced between the start-frame and the end-frame among the decoded picture data.

10. A coded picture data reproducing apparatus as claimed in claim 8, further comprising:

a picture data generator for generating the picture data corresponding to the picture of the frame reproduced from the start-frame to the end-frame among the decoded picture data;

a converter for converting the picture data output from the picture data generator into an analog video signal; and a video signal output terminal for outputting the video signal, which is able to be coupled to the picture display device, and wherein, the pictures corresponding to the respective frames from the start-frame to the end-frame are repetitively reproduced.

11. A coded picture data reproducing apparatus as claimed in claim 8, further comprising:

a picture group address memory for storing address data for searching the picture data in the picture data group which are reproduced just before the picture data group at decoding time;

a memory controller for controlling the data group address memory to store the address data for searching the picture data in the picture data group which are reproduced just before the picture data group wherein picture data of a start-frame belong when the start-frame is designated by the start-frame designator;

a data fetcher controller for controlling the data fetcher to obtain picture data in the picture data group reproduced just before the picture data group wherein the picture data of a start-frame belong based on the address data stored in the data group address memory when an end-frame is designated by the end-frame designator; and a decoder controller for controlling the decoder to decode the picture data belonging to a picture data group reproduced just before the picture data group wherein the picture data of a start-frame belongs, to decode the bi-directional predictive coded picture data corresponding to a frame reproduced between the interframe forward predictive coded picture data corresponding to a frame reproduced last in the picture data group and the intraframe codedd picture data in the picture data group wherein the start-frame belongs by using the interframe forward predictive coded picture data and the intraframe coded picture data, and to decode picture data up to the end-frame, and wherein, the pictures corresponding to the respective frames from the start-frame to the end-frame are repetitively reproduced.

* * * * *